United States Patent [19]
Walker et al.

[11] Patent Number: 5,884,270
[45] Date of Patent: Mar. 16, 1999

[54] METHOD AND SYSTEM FOR FACILITATING AN EMPLOYMENT SEARCH INCORPORATING USER-CONTROLLED ANONYMOUS COMMUNICATIONS

[75] Inventors: Jay S. Walker, Ridgefield, Conn.; Bruce Schneier, Minneapolis, Minn.; T. Scott Case, Darien, Conn.

[73] Assignee: Walker Asset Management Limited Partnership, Stamford, Conn.

[21] Appl. No.: 704,314

[22] Filed: Sep. 6, 1996

[51] Int. Cl.$^6$ .................................................. G06F 17/30
[52] U.S. Cl. .............................. 705/1; 705/26; 379/93.12; 395/200.57; 364/222.2; 364/284
[58] Field of Search ................................... 705/37, 1, 26; 455/2; 380/20, 30, 25; 379/93.12; 395/200.57; 364/222.2, 284

[56] References Cited

U.S. PATENT DOCUMENTS

| | | | |
|---|---|---|---|
| 4,218,738 | 8/1980 | Matyas et al. | 380/25 |
| 4,847,890 | 7/1989 | Solomon et al. | 379/67 |
| 4,870,591 | 9/1989 | Cicciarelli et al. | 364/468.14 |
| 4,914,698 | 4/1990 | Chaum | 380/30 |
| 4,961,224 | 10/1990 | Yung | 380/25 |
| 4,962,449 | 10/1990 | Schlesinger | 395/186 |
| 4,962,532 | 10/1990 | Kasiraj et al. | 380/25 |

(List continued on next page.)

FOREIGN PATENT DOCUMENTS

| | | |
|---|---|---|
| 6-19943 | 1/1994 | Japan . |
| 6-224938 | 8/1994 | Japan . |

OTHER PUBLICATIONS

A. Michael Froomkin, "Flood Control On The Information Ocean: Living With Anonymity, Digital Cash, and Distributed Databases," Conference for the Second Century of the Univ. of Pittsburgh School of Law: The Adequacy of Current Legal Paradigms to Meet Future Challenges (Sep. 21, 1995).
Aaron Weiss, "Grad Seeks Job", *Internet World*, pp. 76–79 (Sep. 1996).
Jeff Ubois, "Anonymity Has Its Place; Questions Concerning On–Line Anonymity Arise," *Information Access Company*, vol. 8, No. 8, p. 28(Apr. 28, 1995).
Debora Sparr et al., "The Net", *Harvard Business Review*, p. 125(May/Jun. 1996).
Gary H. Anthes, "Stealth E–mail Poses Corporate Security Rsik", *Computerworld*, p. 1 (Feb. 12, 1996).
Michelle Quinn, "Web Site For Fake E–Mail Backfires On Operator", *The San Diego Union–Tribune*, Ed. 1–8, p. 7 (Jun. 20, 1995).
Jim Milloway, "Corporate Employment Bulletin Board ", *WebStaff, Inc.*, 1996.
Peter Lewis, "Cloaks and Daggers", *Vantage Point*, p. 133 (Jul. 1996).
Lisa Sanders, "Smile, You're On Job–Candidate Camera", *Business Week*, p. 6 (Aug. 5, 1996).
"Restrac Expands Internet Recruiting . . . ", *Business Wire* (Jul. 10, 1996).
"Romancing The Internet", *Business Wire* (Jul. 12, 1995).
Quay Partners Int'l., Ltd., "Net Gain For Recruiting", *U.S. Banker* (Jul. 1996).

*Primary Examiner*—Parshotam S. Lall
*Assistant Examiner*—David M. Ovedovitz
*Attorney, Agent, or Firm*—Jeffrey L. Brandt

[57] ABSTRACT

A system for facilitating employment searches using anonymous communications includes a plurality of party terminals, a plurality of requestor terminals, and a central controller. The system receives and stores employment data about prospective employment candidates. Upon receiving criteria for candidates of interest from an employer and authorization from the candidates, the central controller releases to the employer the employment data associated with the candidates. The system also establishes communications channels between the employer and the candidates, while maintaining their anonymity.

33 Claims, 12 Drawing Sheets

U.S. PATENT DOCUMENTS

| | | | |
|---|---|---|---|
| 5,018,096 | 5/1991 | Aoyama | 711/164 |
| 5,058,152 | 10/1991 | Solomon et al. | 379/67.1 |
| 5,077,665 | 12/1991 | Silverman et al. | 705/37 |
| 5,107,443 | 4/1992 | Smith et al. | 345/331 |
| 5,164,897 | 11/1992 | Clark et al. | 705/1 |
| 5,267,148 | 11/1993 | Kosaka et al. | 705/37 |
| 5,283,731 | 2/1994 | Lalonde et al. | 705/1 |
| 5,361,295 | 11/1994 | Solomon et al. | 379/67.1 |
| 5,392,353 | 2/1995 | Morales | 380/20 |
| 5,400,393 | 3/1995 | Knuth et al. | 379/88.27 |
| 5,416,694 | 5/1995 | Parrish et al. | 705/8 |
| 5,459,859 | 10/1995 | Senda | 707/10 |
| 5,485,510 | 1/1996 | Colbert | 379/145 |
| 5,495,412 | 2/1996 | Thiessen | 705/1 |
| 5,500,513 | 3/1996 | Langhans et al. | 235/380 |
| 5,509,064 | 4/1996 | Welner et al. | 370/265 |
| 5,553,145 | 9/1996 | Micali | 380/30 |
| 5,608,446 | 3/1997 | Carr et al. | 348/6 |
| 5,664,115 | 9/1997 | Fraser | 705/37 |
| 5,689,799 | 11/1997 | Dougherty et al. | 455/2 |

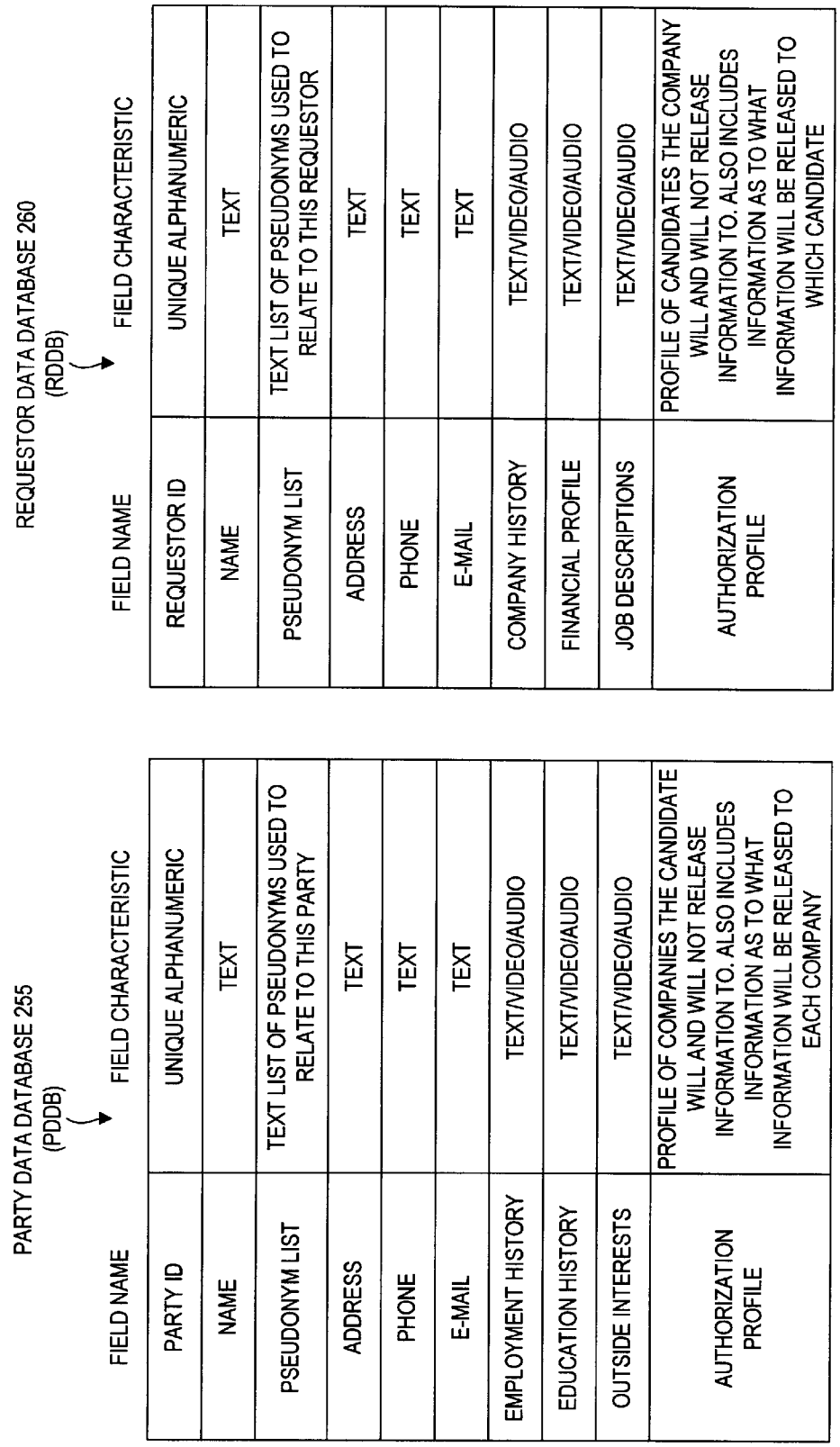

FIG. 2B

PARTY DATA DATABASE 255 (PDDB)

| FIELD NAME | FIELD CHARACTERISTIC |
|---|---|
| PARTY ID | UNIQUE ALPHANUMERIC |
| NAME | TEXT |
| PSEUDONYM LIST | TEXT LIST OF PSEUDONYMS USED TO RELATE TO THIS PARTY |
| ADDRESS | TEXT |
| PHONE | TEXT |
| E-MAIL | TEXT |
| EMPLOYMENT HISTORY | TEXT/VIDEO/AUDIO |
| EDUCATION HISTORY | TEXT/VIDEO/AUDIO |
| OUTSIDE INTERESTS | TEXT/VIDEO/AUDIO |
| AUTHORIZATION PROFILE | PROFILE OF COMPANIES THE CANDIDATE WILL AND WILL NOT RELEASE INFORMATION TO. ALSO INCLUDES INFORMATION AS TO WHAT INFORMATION WILL BE RELEASED TO EACH COMPANY |

REQUESTOR DATA DATABASE 260 (RDDB)

| FIELD NAME | FIELD CHARACTERISTIC |
|---|---|
| REQUESTOR ID | UNIQUE ALPHANUMERIC |
| NAME | TEXT |
| PSEUDONYM LIST | TEXT LIST OF PSEUDONYMS USED TO RELATE TO THIS REQUESTOR |
| ADDRESS | TEXT |
| PHONE | TEXT |
| E-MAIL | TEXT |
| COMPANY HISTORY | TEXT/VIDEO/AUDIO |
| FINANCIAL PROFILE | TEXT/VIDEO/AUDIO |
| JOB DESCRIPTIONS | TEXT/VIDEO/AUDIO |
| AUTHORIZATION PROFILE | PROFILE OF CANDIDATES THE COMPANY WILL AND WILL NOT RELEASE INFORMATION TO. ALSO INCLUDES INFORMATION AS TO WHAT INFORMATION WILL BE RELEASED TO WHICH CANDIDATE |

METHOD AND SYSTEM FOR FACILITATING AN EMPLOYMENT SEARCH INCORPORATING USER-CONTROLLED ANONYMOUS COMMUNICATIONS

BACKGROUND OF THE INVENTION

Field of the Invention

The present invention relates to establishing anonymous communications between two or more parties. More specifically, the invention relates to controlling the release of confidential or sensitive information of at least one of the parties in establishing anonymous communications.

CROSS-REFERENCE TO RELATED APPLICATIONS

This application is related to U.S. patent application Ser. No. 08/711,437 entitled "METHOD AND SYSTEM FOR FACILITATING WHISTLE-BLOWING INCORPORATING USER-CONTROLLED ANONYMOUS COMMUNICATIONS", now abandoned; application Ser. No. 08/708,969 entitled "METHOD AND SYSTEM FOR MATCHMAKING INCORPORATING USER-CONTROLLED ANONYMOUS COMMUNICATIONS"; application Ser. No. 08/708,968 entitled "METHOD AND SYSTEM FOR ESTABLISHING AND MAINTAINING USER-CONTROLLED ANONYMOUS COMMUNICATIONS"; and application Ser. No. 08/711,436 entitled "METHOD AND SYSTEM FOR FACILITATING NEGOTIATIONS INCORPORATING USER-CONTROLLED ANONYMOUS COMMUNICATIONS", now abandoned, each of which filed on Sep. 6, 1996 and assigned to the assignee of the present invention.

Description of the Related Art

The need for anonymous communications can be found in everyday situations. Police hotlines solicit tips from the public to help solve a crime, often without requiring callers to give their names. Cash rewards are often offered for the return of missing items with no questions asked.

One form of anonymity involves "shielded identity," where a trusted agent knows the identity of a masked party, but does not reveal that identity to others except under very special circumstances. Unless otherwise specified, the term "anonymity" is used throughout this application interchangeably with the notion of shielded identity.

Shielded identity appears in a wide range of useful and commercial functions. A company might run an employment advertisement in a newspaper with a blind P.O. box known only to the publisher. A grand jury could hear testimony from a witness whose identity is known only to the prosecutor and the judge, but is concealed from the jurors, the accused, and opposing counsel. A person could identify a criminal suspect from a lineup of people who cannot see him. A recruiter could contact potential candidates for a job opening without revealing the client's name. Witness protection programs are designed to shield the true identity of witnesses enrolled in the programs. A sexual harassment hotline could be set up for victims of sexual harassment to call in with their complaints, while promising to protect the callers' identities.

The above examples illustrate the need for anonymity or shielded identity due to a fear of exposure. The nee for anonymity can also be motivated by a desire for privacy. For instance, donors may wish to make an anonymous charitable contribution, an adoption agency typically shields the is entity of a child's birth mother, a Catholic confessional offers anonymous unburdening of the soul, and local phone companies maintain millions of unlisted telephone numbers accessible only by special operators.

The concepts of anonymity and shielded identity do not lend themselves to conventional communication systems. While it is possible to send and receive anonymous messages, such as a postcard with no return address or a call placed from a pay phone, it is difficult for parties e gaged in multiple communication episodes to remain anonymous from one another. In general conventional communication systems are premised upon the notion that communicating parties know each other's identity. For the purposes of this invention, the term "communications system" refers to any system that facilitates an ongoing cycle of messages and responses.

Most current communications systems, whether written or oral, do not permit an ongoing, multi-party, shielded identity dialogue. For example, letters need an address to be delivered, calling someone on the phone requires a phone number, and meeting face-to-face provides for visual identification. The process involved in most ongoing communication systems is simply not conducive to retaining concealed identities.

Yet, in some cases, concealing identity can actually encourage or facilitate communication between unwilling or cautious parties. For example, a party negotiating a peace treaty with another may be unwilling to reveal his identity because, if the negotiations fail, that party might be exposed or subjected to potential blackmail.

One specific example of the need for concealing identities is in the employment search process, where the release of the name of the hiring company (or the position involved) could be damaging to the company. The hiring company might be concerned about how potential competitors would use the knowledge that the company is searching for employees to upset customers who are relying on the stability of the company. Mere speculation that a company is searching for a new president could dramatically reduce the price of the company's stock. To find potential candidates for the vacant position, the company could engage an employment search firm to discretely find potential candidates without disclosing to the market, or even potential candidates, the company's identity until the company decides to confide in or hire a particular candidate.

In engaging such employment search firms, however, a hiring company entails some risk that the search firm will prematurely or indiscriminately reveal the company's identity to a potential candidate. Search firms are generally compensated based upon the number of successful placements, and thus are motivated to make vacant positions appear as attractive as possible to potential candidates. In doing so, search firms could be tempted to reveal enough information about the company for potential candidates to discover the identity of the company, or, for that matter, the firms may reveal the company's identity itself. Accordingly, hiring companies cannot be counted upon to maintain effective control of what information is released to potential candidates, and thus are unable to instill any satisfactory degree of confidence in their clients about the confidential status of their search for job replacements.

The use of search firms also creates inefficiencies. In dealing with a search firm, candidates looking for a new job may engage in a dialogue with the search firm, asking a series of detailed questions about the particular job, company expectations, various qualification criteria, benefits, options, perks, and other factors, all without the candidate knowing the name of the hiring company. In response, the search firm may reveal, from general to specific, information about the hiring company. For instance, in response to questions, the search firm may successively reveal that the hiring company is a Fortune 500 company, a transportation company, an airline, headquartered in the Midwest, and, finally, that it is United Airlines. In return, the candidate may also authorize the search firm to release information about itself For instance, the search firm may disclose that the candidate is employed at a small software company, that he is the head of a software development group of seven programmers, then that he is earning $75,000 plus a $20,000 bonus in his current job, then that he is located in the Stamford, Conn. area and then finally his identity.

From the outside, these actions may appear to be a type of "dance," where each party seeks to learn the necessary information to keep the process moving forward. To answer any difficult questions, the search firm, trusted by both parties, facilitates an assisted dialogue between the candidate and the company.

By creating this additional layer in the communication process, however, the amount of effort and expense incurred by the hiring party and the candidates increases. Further, using such a search firm creates delays in communicating information between the company and the candidates and increases the likelihood that misunderstandings may occur.

In addition, the success of a search firm to fill a position is limited by the number of candidates that the search firm contacts. Search firms may target only certain individuals while overlooking many other qualified candidates who, if contacted, would have been very interested in considering the available positions. As such, search firms often do not reach a large pool of potential candidates. Search firms also know that the candidates most qualified for jobs are those that are currently employed. Recruiters would love to be able to show these coveted employees even better opportunities. Unfortunately, search firms have no way of identifying and contacting these prime candidates. Present systems for recruiting typically rely on the candidate to present himself to the recruiter—at a substantial risk to the employee. No system currently gives an employee the incentive and protection he needs to feel comfortable submitting his resume.

Another area in which shield identity may be desirable is dating. For example, a person could serve as a match-maker by setting up two people with whom he is acquainted on a blind date. Before agreeing to go on the date, each acquaintance may ask the match-maker questions about the other person and instruct the match-maker not to reveal his/her identity without prior authorization. Once each of the acquaintances feels comfortable about the other person, he/she may authorize the match-maker to reveal his/her identity and agree to the date.

Again, however, the use of match-makers suffers from the same drawbacks as the search firms. There is little or no control over what information match-makers disclose. For instance, a match-maker may feel greater loyalty to one of the acquaintances and willingly divulge the identity of the other acquaintance. Also, using match-makers slows down the communication process and can result in miscommunication. Finally, the number of people that a match-maker can set up is limited by the number of people to whom the match-maker is acquainted.

Attempts have been made to automate the employment search process and matchmaking process. For instance, U.S. Pat. No. 5,164,897 discloses an automated method for selecting personnel matching certain job criteria. Databases storing employee qualifications are searched to identify which personnel have qualifications matching search criteria. Such a system, however, does not provide anonymous communications between the employer and the employee and does not provide control over the release of information stored within those systems to others. Thus, there is a need for a system that allows users to exercise control over the release of information to others and that provides efficient anonymous communication.

SUMMARY OF THE INVENTION

Accordingly, the present invention is directed to a communications method and system that obviates problems due to limitations and disadvantages of the prior art.

A goal of the invention is to provide a communication system incorporating a central database of information supplied by one or more of parties and managed by a central administrator, where all parties to the system can manage and control the release of any or all information about themselves or their identities, and where such a system allows for electronic-based communications between the parties without the necessity of revealing the identity of either party.

Another goal of the invention to allow parties to submit criteria for searching a trusted agent's confidential database and receive a count of the number of records that satisfy the criteria, without revealing the identities of the parties associated with those records.

A further goal of the invention is to allow a system administrator to send a request for authorization to release information about a party to a searching party.

Other goals of the invention are to provide a system that encrypts communications between parties to maintain the anonymity of the parties; to authenticate searchable information contained in a central database for release to parties; to allow one or both parties to receive compensation for contributing or maintaining information accessible in a database; and to allow one party to apply a customized scoring algorithm to information contained about other parties in a database.

Still other goals of this invention are to provide a system for a trusted agent to act as an anonymous remailer or communicate via e-mail or other electronic means with specific outside parties requested or identified by one of the parties to validate information about the parties.

Yet another goal of the invention is to be able to store and authenticate such information that may be provided by outside parties in a central database while allowing the outside parties to retain control over the release of respective information to other parties.

This invention meets these goals by allowing a party to maintain effective control over the timing and release of certain information stored in a database, including the party's identity and other relevant data about the party, to another party. This controlled release of identity can be performed gradually in a series of steps where the party authorizes release of more and more information. The invention also authenticates information stored in the database before releasing the information, thereby improving the reliability of the released information. Finally, the invention establishes a communications channel between a party and a requestor while not necessarily revealing the identity of the party and/or the requestor to each other. The controlled release of information in the invention allows for new improvements in the quality of the communication process when one party to the process would suffer significant costs or be exposed to significant risks if their identity were released prematurely or indiscriminately.

According to the present invention, a method and system is disclosed for operating a computer system to facilitate an exchange of identities between two anonymous parties. The method and system are operative to receive from a first party first data including an identity of the first party and to receive from the first party at least two first-party rules for releasing the first data including a rule for releasing the identity of said first party. The system and method are further operative to receive from a second party a search request comprising at least one search criterion; receive from the second party second data including an identity of the second party; and receive from the second party at least two second-party rules for releasing the second party data including a rule for releasing the identity of the second party.

The system and method are further operative to process said search request to determine if the first data satisfies the search criterion and if so, then exchanging the first and second data, except the identities of the first and second parties, between the first and second parties in accordance with the first-party and second-party rules. The system and method are further operative to transmit the identity of the first party to the second party after the exchanging step, upon satisfying the first-party rule for releasing the identity of the first party, and after the exchanging step, upon satisfying the second-party rule for releasing the identity of the second party, transmitting the identity of the second party to the first party.

BRIEF DESCRIPTION OF THE DRAWINGS

The accompanying drawings provide a further understanding of the invention and are incorporated in and constitute a part of this specification. The drawings illustrate preferred embodiments of the invention, and, together with the description, serve to explain the principles of the invention.

In the drawings:

FIG. 2B illustrates the contents of a party data database and a requestor data database in accordance with the embodiment in FIG. 1;

DETAILED DESCRIPTION OF THE INVENTION

System Structure

Figure 1:
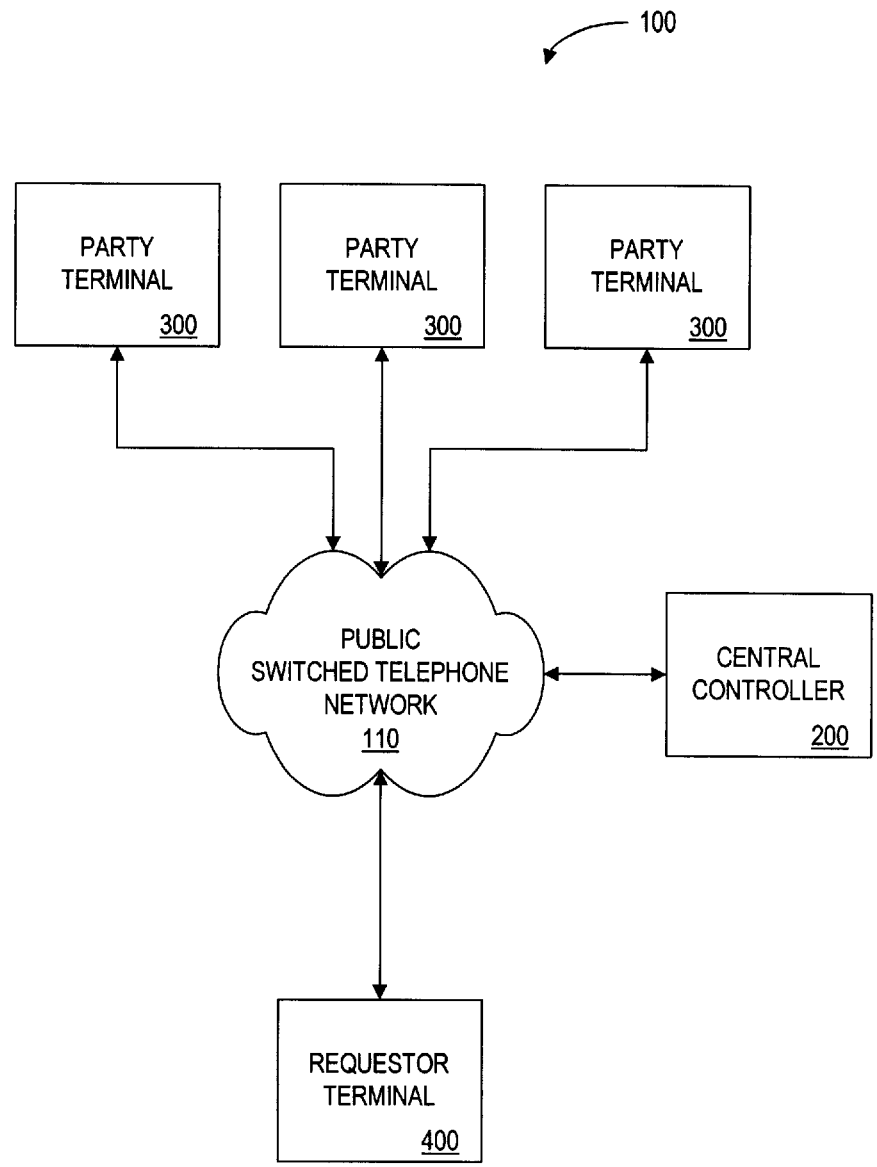
FIG. 1 illustrates one embodiment of the present invention.

FIG. 1 illustrates one embodiment of an anonymous communication system 100 according to this invention. System 100 identifies parties having characteristics of interest to a requestor, releases certain information about the identified parties to the requestor with authorization from the parties, releases certain information about the requestor to the identified parties with authorization from the requestor, and provides a communications channel between the identified parties and the requestor while maintaining their anonymity. For example, system 100 can be used to allow an employer (the requestor) to communicate with prospective candidates (the parties) whose background satisfies employment criteria provided by the employer without revealing the identity of the employer or the identities of the candidates. In a specific example, a software company may want to hire a programmer with 5+ years experience in writing C++, who is willing to live in Seattle, who will work 12–14 hour days 6 days a week, who will work for between $100,000 to $150,000 in salary plus bonuses, and who wants the opportunity to work for a startup with stock options in a publicly-traded company that could effectively double his salary. System 100 could identify a dozen candidates from resumes stored in a database, release information about these candidates only as authorized to the company, and deliver messages between the company and candidates without the company ever knowing the candidates identities. Although the invention can be used in connection with other applications, for the purpose of illustration, the employment search example is used throughout the specification.

System 100 includes a public switched phone network 110, a central controller 200, party terminals 300, and requestor terminals 400. Central controller 200, party terminals 300, and requestor terminal 400 preferably connect to network 110 through respective two-way communication links. Parties (e.g., candidates) access system 100 through respective party terminals 300, and a requestor (e.g., an employer) accesses system 100 through requestor terminal 400. The flow of data from terminals 300 and 400 is preferably limited and controlled by central controller 200.

Under the control of central controller 200, public switched telephone network 110 routes data to and from central controller 200, party terminals 300, and requestor terminal 400. In a preferred embodiment, network 110 comprises a commercially-implemented network of computer-controlled telephone switches operated by, for example, a telephone company. Network 110 may also include communication networks other than a public switched telephone network, such as a wireless network, a paging network, or the Internet.

Central controller 200 controls the flow of data to and from party terminals 300 and requestor terminal 400. Preferably, central controller 200 stores and authenticates the authorship of "party data" and "requestor data" received from party terminals 300 and requestor terminal 400, respectively. "Party data" comprises data about or corresponding to a respective party. "Requestor data" comprises data about or corresponding to the requestor. In the employment search example, party data would include information that may be of interest to an employer about respective candidates, such as a candidate's identity, the candidate's address, the candidate's vital statistics, the candidate's work experience, the candidate's educational background, and the candidate's interests.

In one embodiment used with an employment system, each party fills out an electronic form that gets converted into an HTML format. This presents the party's employment history as a "hyper-resume." When released to a requestor, this resume allows the requestor to get more information about certain areas of a party's history. The hyper-links can point to additional text, QuickTime video, JPG photos or audio clips, allowing for a rich presentation of information about the party. Requestor data would include information about the employer, such as the employer's identity, the number of its employees, the locations of its offices, the industry in which the employer operates, the positions available and their job descriptions, fiscal information about the employer, and the history of the employer. The requestor data is collected and stored using similar techniques to those outlined above for an employee's employment history.

In addition, central controller 200 controls the release of requestor data and party data that the requestor and respective parties, respectively, have authorized for release. Central controller 200 also establishes a communications channel between party terminals 300 and requestor terminal 400, while maintaining the anonymity of the parties using party terminals 300 and the requestor using requestor terminal 400. The structure of controller 200 is described in greater detail below in connection with FIG. 2A.

Party terminal 300 provides a party with an interface to system 100. Preferably, party terminal 300 allows a party to enter party data and transmits it to central controller 200 via network 110. Party terminal 300 also allows a party to indicate which of the entered party data system 100 is authorized to release to a requestor, view requestor data, and communicate anonymously with the requestor at requestor terminal 400. The structure of party terminal 300 is described in greater detail in connection with FIG. 3.

Requestor terminal 400 provides a requestor with an interface to system 100. In a preferred embodiment, requestor terminal 400 allows a requestor to enter requestor data and transmits the requestor data to central controller 200 via network 110. Requestor terminal 400 also allows a requestor to enter search criteria about parties of interest, to indicate which of the entered requestor data system 100 is authorized to release to a particular party, view party data, and communicate with parties at party terminals 300. The structure of requestor terminal 400 is described in greater detail in connection with FIG. 4.

Figure 2A:
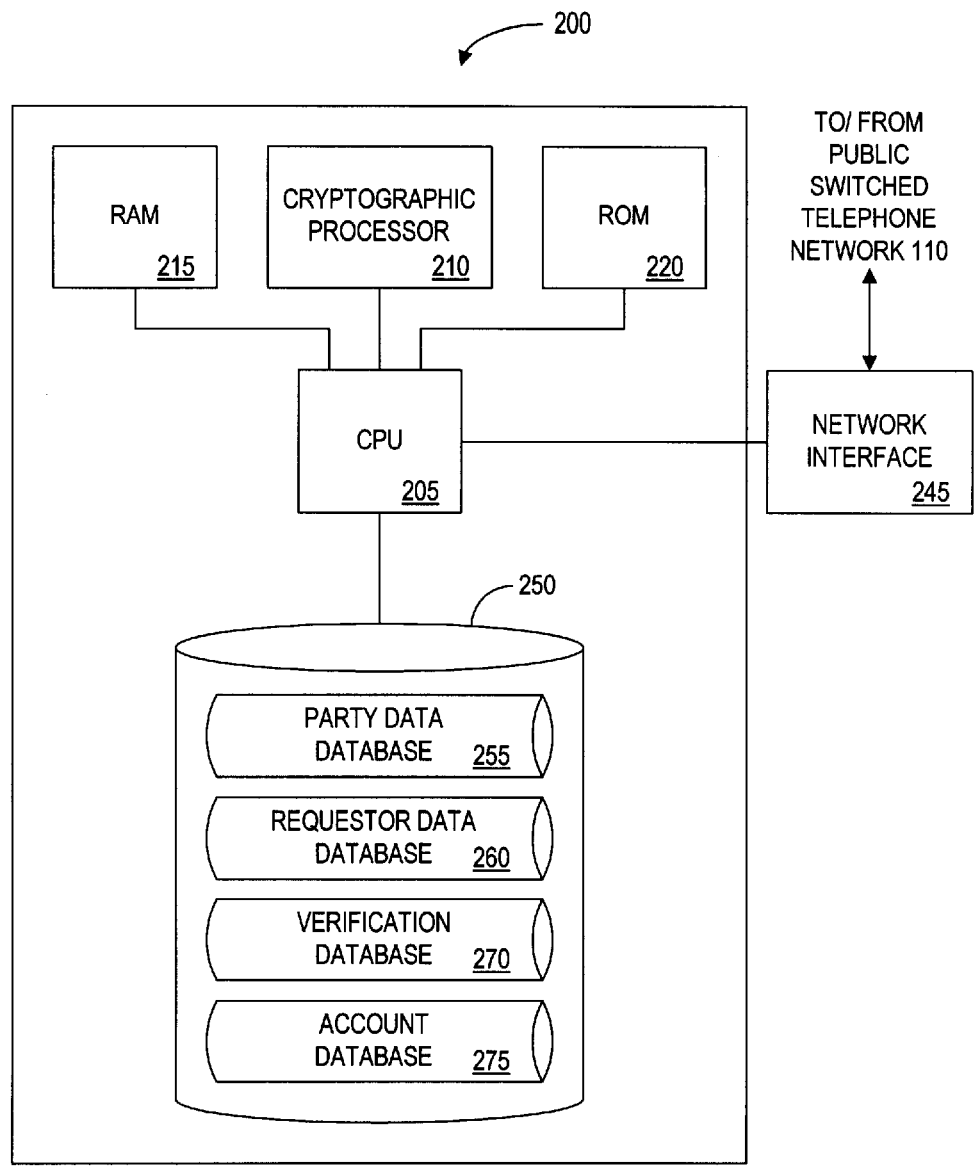
FIG. 2A illustrates a block diagram of the central controller of the system in accordance with the embodiment in FIG. 1.

FIG. 2A illustrates a block diagram of central controller 200. As shown in FIG. 2A, central controller 200 includes CPU 205, cryptographic processor 210, RAM 215, ROM 220, network interface 245, and data storage device 250. Data storage device 250 includes a plurality of databases, including party data database 255, requestor data database 260, verification database 270, and account database 275, as well as program instructions (not shown) for CPU 205. CPU 205 is connected to each of the elements of central controller 200.

Figure 2C:
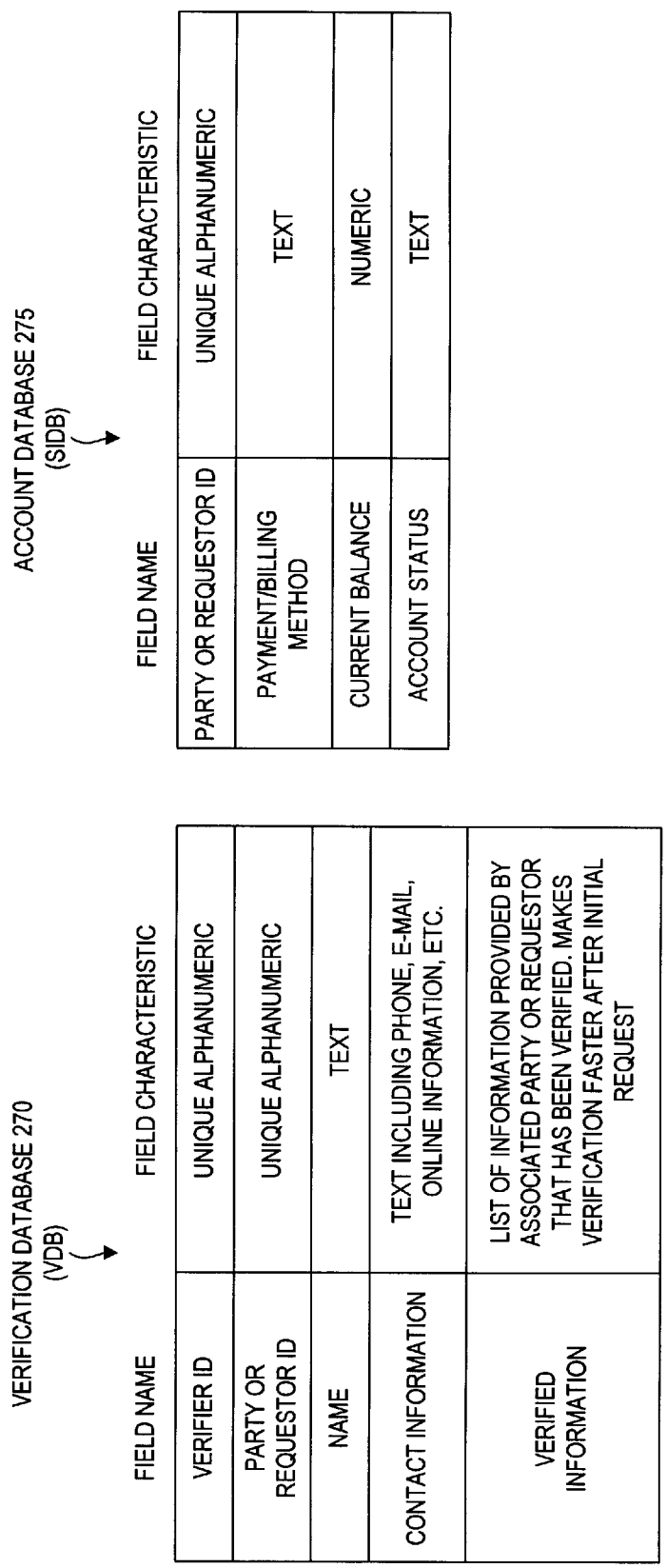
FIG. 2C illustrates the contents of a verification database and an account database in accordance with the embodiment in FIG. 1.

The databases in data storage device 250 are preferably implemented as standard relational databases capable of supporting searching and storing multimedia information such as text, video, QuickTime movies, photographs, and audio. FIG. 2B illustrates exemplary record layouts for party data database 255 and requestor data database 260, and FIG. 2C illustrates record layouts for verification database 270 and account database 275. Each record layout preferably comprises a two-dimensional array of information with one column for "Field Name" and another column for "Field Characteristic." The rows correspond to respective fields.

The "authorization profile" field contained in each of the party data and requestor data databases preferably comprises a list of rules for releasing party or requestor data. For example, the rules could simply include a list of companies to which party data is not to be released, or include characteristics of certain companies to which party data can be released, such as companies that are in the Fortune 500 and have stock option plans.

Verification database 270 preferably includes cross-referencing fields (not shown) to party data database 255 and requestor data database 260. This allows indexing by verified information as well as other types of searches.

CPU 205 executes program instructions stored in RAM 215, ROM 220, and data storage device 250 to perform various functions described in connection with FIGS. 5–9. In a preferred embodiment, CPU 205 is programmed to maintain data, including party data and requestor data, in storage device 250. CPU 205 receives party data and requestor data from network 110 through network interface 245 and stores the received party data and requestor data in databases 255 and 260, respectively. CPU 205 is also programmed to receive and store information in party database 255 and requestor database 260 indicating which of the party data and requestor data respective parties and requestors have authorized for release. Upon receipt of a request for authentication, CPU 205 transmits a verification request to a verification authority to authenticate the origin, authorship, and integrity of the party data and requestor data stored in databases 255 and 260, respectively, and maintains a record of the verification request in database 270.

CPU 205 is also preferably programmed to search databases 255 and 260 and transmit information in response to the search. CPU 205 receives a search request containing certain criteria and searches the databases of storage device 250 to find matches. Based upon the search, CPU 205 releases certain information to the requestor and the parties. Also, CPU 205 preferably assigns pseudonyms to each party and requestor, and stores the pseudonyms in databases 255 and 260, respectively. The pseudonyms can include coded identifiers, web page addresses, bulletin board addresses, pager numbers, telephone numbers, e-mail addresses, voice mail addresses, facsimile telephone numbers, and postal mail addresses.

CPU 205 receives search criteria pertaining to parties of interest to the requestor and searches database 255 to identify parties whose party data satisfies the search criteria. There are a number of search techniques that can be used including keyword, fuzzy logic, and natural language search tools. For example, an employer could search for candidates with the following criteria: "two years of patent writing experience and lives in New England." CPU 205 compares the criteria against each party registered with the system using one or more search algorithms and transmits to the requestor the number of parties identified. If CPU 205 receives a request for party data corresponding to the identified parties, CPU 205 transmits to requestor terminal 400 the party data that the identified parties previously authorized for release along with respective pseudonyms. CPU 205 can also transmit queries to party terminals 300 inquiring whether respective parties authorize the release of additional party data. If CPU 205 receives a request for requestor data from a party, CPU 205 transmits to the appropriate party terminal 300 the request data that the requestor previously authorized for release, along with a pseudonym corresponding to the requestor.

CPU 205 is preferably also programmed to provide an anonymous communications channel between party terminals 300 and requestor terminal 400. CPU 205 receives a request for an anonymous communications channel along with a pseudonym of a party and a requestor. In one embodiment, CPU 205 establishes either a real-time or non-real-time communications channel between the party and the requestor corresponding to the received pseudonyms. For example, CPU 205 could transmit control signals to configure network 110 to provide a direct telephone connection between the party and the requestor at their respective terminals 300 and 400, thereby establishing a real-time communications channel. In another example, CPU 205 could receive and store electronic mail messages in electronic mailboxes assigned to the party and the requestor for their retrieval, thereby establishing a non-real-time communications channel.

CPU 205 preferably comprises a conventional high-speed processor capable of executing program instructions to perform the functions described herein. Although central controller 200 is described as being implemented with a single CPU 205, in alternative embodiments, central controller 200 could be implemented with a plurality of processors operating in parallel or in series.

RAM 215 and ROM 220 preferably comprise standard commercially-available integrated circuit chips. Data storage device 250 preferably comprises static memory capable of storing large volumes of data, such as one or more floppy disks, hard disks, CDS, or magnetic tapes.

Network interface 245 connects CPU 205 to network 110. Interface 245 receives data streams from CPU 205 and network 110 formatted according to respective communication protocols. Interface 245 reformats the data streams appropriately and relays the data streams to network 110 and CPU 205, respectively. Interface 245 preferably accommodates several different communication protocols.

Cryptographic processor 210 is programmed to encrypt, decrypt, and authenticate the stored data in each of the databases described above. Cryptographic processor 210 encrypts and decrypts data received by and transmitted from CPU 205. In a preferred embodiment, all party data and requestor data are encrypted before being transmitted onto network 110. Also, processor 210 encrypts the data before CPU 205 transmits such data via network 110. Any encrypted data received by CPU 205 is decrypted by processor 210. The cryptographic protocols used by cryptographic processor 210 are described below in the section entitled "Cryptographic Protocols."

Figure 3:
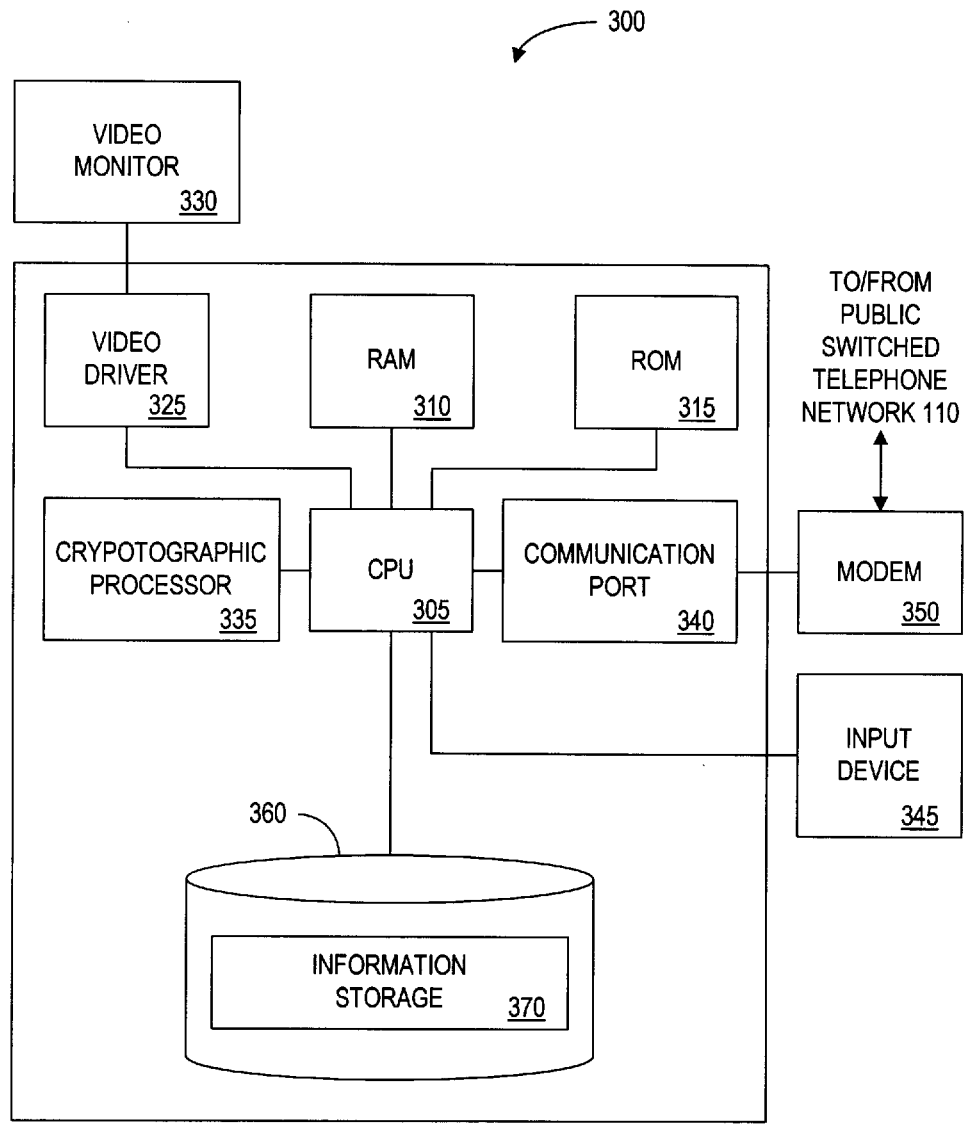
FIG. 3 illustrates a block diagram of a party terminal in accordance with the embodiment in FIG. 1.

FIG. 3 illustrates a block diagram of party terminal 300, according to one embodiment of the invention. Party terminal 300 includes CPU 305, which is connected to RAM 310, ROM 315, video driver 325, cryptographic processor 335, communication port 340, input device 345, and data storage device 360. Video monitor 330 is connected to video driver 325, and modem 350 is connected to communication port 340 and public switched phone network 110.

CPU 305 executes program instructions stored in RAM 310, ROM 315, and information storage 370 to carry out various functions associated with party terminal 300. In a preferred embodiment, CPU 305 is programmed to receive data from input device 345, receive data from communication port 340, output queries and received data to video driver 325 for display on video monitor 330, and output data to communication port 340 for transmission by modem 350. CPU 305 preferably transmits the data to cryptographic processor 335 for encryption before outputting data to communication port 340 for transmission to network 110. When CPU 305 receives encrypted data, CPU 305 transmits the encrypted data to cryptographic processor 335 for decryption.

CPU 305 preferably comprises a high-speed processor capable of performing the functions described herein. RAM 310 and ROM 315 comprise standard commercially-available integrated circuit chips. Information storage 370 comprises static memory capable of storing large volumes of data, such as one or more of floppy disks, hard disks, CDs, or magnetic tapes. Information storage 370 stores program instructions and received data.

Video driver 325 relays received video and text data from CPU 305 to video monitor 330 for display. Video monitor 330 is preferably a high resolution video monitor capable of displaying both text and graphics. Cryptographic processor 335 encrypts and decrypts data in accordance with conventional encryption/decryption techniques and is preferably capable of decrypting code encrypted by cryptographic processor 210. Communication port 340 relays data between CPU 305 and modem 350 in accordance with conventional techniques. Modem 350 preferably comprises a high-speed data transmitter and receiver. Input device 345 comprises any data entry device for allowing a party to enter data, such as a keyboard, a mouse, a video camera, or a microphone. The operation of party terminal 300 is described in greater detail in connection with FIGS. 5–9.

Figure 4:
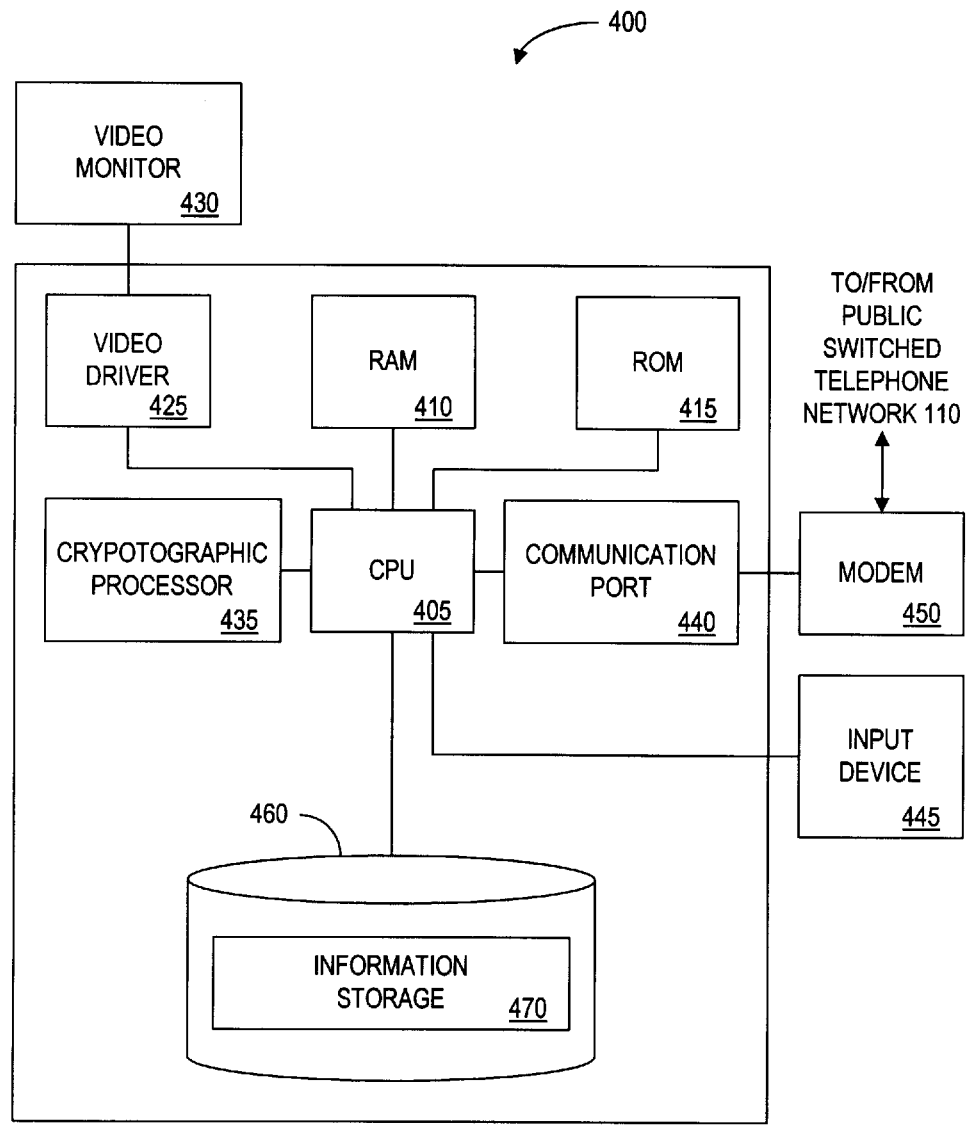
FIG. 4 illustrates a block diagram of a requestor terminal in accordance with the embodiment in FIG. 1.

FIG. 4 illustrates a block diagram of requestor terminal 400 according to the invention. Terminal 400 in FIG. 4 includes CPU 405, which is connected to RAM 410, ROM 415, video driver 425, cryptographic processor 435, communication port 440, input device 445, and data storage device 460. Video monitor 430 is connected to video driver 425, and modem 450 is connected to communication port 440 and public switched telephone network 110. Terminals 300 and 400 are shown in FIGS. 3 and 4 to be structurally similar, though different reference numerals are used. As such, a more detailed description of terminal 400 can be obtained by referring to the above description of terminal 300. In a preferred embodiment, however, terminals 300 are used by parties, whereas terminal 400 is used by a requestor.

Cryptographic Protocols

As described above, system 100 encrypts data before transferring such data between system users (including both parties and requestors) and central controller 200, thereby providing various levels of security and privacy protection. As used throughout this section, the term "users" refers to both parties and requestors. A book entitled Applied Cryptography: Protocols, Algorithms, And Source Code In C by Bruce Schneier (2d Ed, John Wiley & Sons, Inc., 1996) describes in detail numerous cryptographic protocols that can be used.

These protocols can be understood from the following basic overview.

The following notation is used throughout the description of cryptographic protocols:

$PKE_A$: refers to the public encryption key of user A. This can be an RSA public key or a key for some other public key encryption scheme.

$SKE_A$: refers to the secret decryption key corresponding to encryption key $PKE_A$.

$PKS_A$: refers to the public component of user A's signature key. This can be a DSS key or a key for some other public key signature scheme. It can also be the same key as $PKE_A$ in public key systems like RSA.

$SKS_A$: refers to the private signature key corresponding to $PKS_A$. It can also be the same key as $SKE_A$ in public key systems like RSA.

$E_{PKE}(M)$: refers to the encryption of the plain text message M with the public encryption key PKE.

$D_{SKE}(C)$: refers to the decryption of the cipher-text message C with the secret decryption key SKE.

$E_K(M)$: refers to the encryption of message M with a symmetric encryption algorithm and key K. It is apparent from the context whether the protocol uses public key or symmetric key encryption.

$D_K(C)$: refers to the decryption of the cipher-text message C with a symmetric encryption algorithm and key K.

$S_{SKS}(M)$: refers to signature of message M with secret signature key SKS.

H(M): refers to the hash of the message M with a cryptographic hash function like MD5 or SHA.

A,B: refers to the concatenation of A and B. This is commonly used when describing messages.

Public key encryption systems are usually several orders of magnitude slower than private (symmetric) key encryption systems. As a result, central controller 200 preferably uses the following protocol or the like to encrypt messages. Suppose that Alice wants to encrypt a message M so that only Bob can read it.

1. Alice obtains Bob's public encryption key, $PKE_B$, generates a random symmetric encryption key K, and encrypts it with Bob's public key.
2. Alice encrypts the message M with the key K using a symmetric encryption algorithm, like Triple-DES or IDEA, and sends
   $M_0 = E_{PKE^B}(K), C$
   where $C = E_K(M)$.
3. Bob decrypts the key K using his private decryption key
   $K = D_{SKE^B}(E_{PKE^B}(K))$
   and uses the key to decrypt the message
   $M = D_K(C) = D_K(E_K(M))$ The bulk of the encryption is done using the symmetric encryption algorithm, which is orders of magnitude faster than the public key encryption algorithm. When a user encrypts a message to central controller 200 using central controller 200's public key, it is assumed that the user and central controller 200 carry out the above protocol.

Typical signature schemes (e.g. RSA or DSS) use a key pair for creating signatures and verifying them. One part of the pair, the private part, is used for generating signatures. The transformation for generating a signature is defined in such a way that only someone who knows the private part of the key pair can generate a signature. Hence, only the owner of the key pair can generate signatures.

The other part of the pair, the public part, is used to verify signatures. Anyone, including the owner of the key pair, can use the public component to verify that a signature is valid. However, it is computationally infeasible to use the public component to forge a signature.

One example of such a signature scheme is the RSA public-key encryption system. In such a system, each user has a public key consisting of a modulus n and an exponent e, where n is a product of two secret primes p and q. The private component is an exponent d such that $ed = 1 \pmod{(p-1)(q-1)}$.

To sign a message M with an RSA key pair, the user computes $S = M^d \pmod{n}$.

where the result S is the signature. In order to verify the signature, a user simply computes $S^e = M^{ed} = M \pmod{n}$.

The signature verifies correctly if the result of computing $S^e \pmod{n}$ is the message that the signature is for, i.e. $S^e = M \pmod{n}$. Thus, a user must know d in order to generate a signature.

Public key signature schemes, however, are slow and a user can only sign messages that are smaller than n (when encoded in the ring Z/nZ). One solution is to hash the message M with a cryptographic hashing scheme (e.g. MD5 or SHA), and then sign the hash. The resulting hash is usually much smaller than the message and hence easier to sign.

In addition, generating two messages with the same hash is computationally infeasible, so it is extremely difficult to generate two messages which will have the same signature. Therefore, the following protocol is an RSA-like signature protocol which will preferably be used whenever a user or central controller 200 needs to sign and verify messages and will be known as $S_{SKS}(M)$:

1. Alice generates a message M which she wishes to sign.
2. Alice computes h=H(M), the one-way hash of M with a predetermined hashing algorithm.
3. Alice computes
   $S = h^d \pmod{n}$
   which is her signature. Hence,
   $S_{SKS^A}(M) = (H(M))_{SKS^A} \pmod{n}$.

The following protocol can be used by any user to verify Alice's signature:

1. Bob receives a message M and corresponding signature S, which he wants to verify. He believes that Alice generated the signature.
2. Bob computes $M' = S_{PKS^A} \pmod{n}$ where n is Alice's public modulus (it is specified as part of $PKS_A$).
3. Bob verifies that M=M'. If they match, then Alice's signature verifies successfully. Otherwise the verification fails.

Most of the protocols described require public encryption keys or private signature keys (or both). Each user communicating with central controller 200 should receive encrypted messages from central controller 200 and sign messages that they send to central controller 200. Hence, each user in the system requires a public/private encryption key pair and a public/private signature key pair. As noted above, these pairs could be the same pair in systems like RSA.

Generating a key pair, either signature or encryption, depends heavily upon the intended algorithm. A brief example for generating RSA encryption (and signature) keys is shown below.

1. Central controller 200 determines the size for the public key. Typically, a 768-bit key is the recommended minimum, but 1024-bits provide a better minimum.
2. Central controller 200 generates two primes p and q such that p>sqrt(pq)>q, and p and q are not close together (i.e. they are both roughly sqrt(n) in size, but different in size by two or three bits).
3. Central controller 200 computes n=pq. This is the public modulus.
4. Central controller 200 chooses a public exponent e. Common choices are 3, 17, and 65537 ($2^{16}+1$).
5. Central controller 200 computes the private exponent d by finding d such that
   $ed = 1 \pmod{(p-1)(q-1)}$.
   Central controller 200 can do this using the extended Euclidean Algorithm.

6. Central controller 200 publishes n and e as the public key. e is the public exponent which people use to encrypt messages to the public key user (a party, requestor or central controller 200) or to verify the signature (if the pair is the signature pair). The secret exponent, d, is what is used to decrypt messages sent to the user or to generate signatures.

The primes that central controller 200 chooses are preferably chosen at random. If an attacker can determined and q, then the attacker can also determine d. Several tests exist for determining whether a randomly chosen number m is prime or not. Typically one chooses a random number m and then uses primality tests to determine the first prime greater than or equal to m.

When encrypting a message to be transmitted or verifying a signature, there needs to be a way of verifying the appropriate public key. One common way is to implement a hierarchical certification system in which each valid public key has a corresponding key certificate. The key certificate is signed by another user's private signature key higher up in the key hierarchy. At the top of the hierarchy is the private signature key of the certificate authority, whom everyone automatically trusts. In this case, the certificate authority would be central controller 200.

The purpose of a certificate is to bind together in some authenticated way a public key, and a set of statements about this public key. The most important statement made is usually who owns the public key. Other potentially important statements might deal with what the key is and is not authorized to do, and when the key expires.

The best-known standard for key certificates is X.509. More detailed information on the construction of X.509 certificates can be found in CCITT, Dract Recommendation X.509, "The Directory-Authentication Framework," Consultation Committee, International Telephone and Telegraph, International Telecommunications Union, Geneva, 1989 or RSA Laboratories, "PKCS #6: Extended-Certificate Syntax Standard," Version 1.5, November 1993.

In a preferred embodiment of the invention, central controller 200 has at least one signature key pair for which everyone using the system knows the public signature key. In one embodiment of the invention, central controller 200 will use two signature key pairs: one key pair for signing key certificates and one key pair for use in the rest of the protocols described. Central controller 200 keeps the certificate authority signature pair under lock and key except for when a key certificate needs to be signed. On the other hand, the other signature key pair is available at all times.

Each time a new user (a party or requestor) registers with central controller 200, the certificate authority signature key is used by central controller 200 to sign a unique signature key pair for the user. This needs to be done before a user uses their signature key pair for the first time. In one embodiment of the invention, central controller 200 generates a signature key pair and signed key certificate for the user. In an alternate embodiment, the user creates his own key pairs.

Once a user involved in the system has a signed key certificate for his public signature key, he can then use that signature key to sign a key certificate for his public encryption key. Central controller 200, acting as the certificate authority, can also sign the key certificates for encryption keys. This has the advantage of reducing the number of signature verifications. In an embodiment of the present invention, the same method for generating signature key pairs is used for generating encryption key pairs.

A user follows the following basic protocol when registering with central controller 200. Suppose that Alice is such a user:

1. Alice obtains a signature key pair.
2. Alice generates a key certificate for her public signature key, sends a copy of the certificate and the public key to central controller 200, and asks central controller 200 to sign the certificate.
3. Central controller 200 sends Alice a copy of the signed certificate.
4. Alice obtains an encryption key pair.
5. Alice generates a key certificate for her public encryption key and signs it with her private signature key.
6. Alice sends a copy of her public encryption key, along with a copy of the signed key certificate, to central controller 200.

After carrying out this protocol, Alice has a signed signature key and a signed encryption key. Furthermore, any user who wishes to send an encrypted message to Alice or verify her signature can obtain the public key component from central controller 200.

For most of the protocols described used in the invention, it is assumed that central controller 200 stores signatures and the public components for all signature keys used in the system. In addition, it is assumed that each user has a copy of the public components of both of the central controller 200's signature keys. Most communication in system 100 occurs between parties and central controller 200 and between requestors and central controller 200. Where a requestor and a party communicate directly, each obtains copies of the other user's public signature and encryption keys from central controller 200.

System 100 may be prone to attempted infiltration, or "attacks," if the requestor and central controller 200 do not use an interlock protocol. Schneier et al., "Automatic Event-Stream Notarization Using Digital Signatures," in *Advances in Cryptology, Proceedings of the Cambridge Protocols Workshop* 96, Springer-Verlag, 1996. The interlock protocol "locks" the signatures generated by both users of a protocol to a particular instance of the protocol. This is accomplished by having each user sign a packet which the other user randomly generates. This causes the protocol to be non-deterministic and hence the signatures from one instance do not apply to another. The interlock protocol is described briefly below. Suppose that a party wishes to send a message C to central controller 200:

1. The party generates a random number $R_0$ and sends $M_0 = R_0, S_{SKS_P}(R_0)$ to Central controller 200.
2. Central controller 200 verifies the party's signature. Central controller 200 then generates a random number $R_1$ and sends
   $M_1 = R_1, S_{SKS_{CC}}(H(M_0), R_1)$
   to the party.
3. The party verifies central controller 200's signature. Central controller 200 then sends
   $M_2 = C, S_{SKS_P}(H(M_1), C)$
   to central controller 200.

The party and central controller 200 both sign packets using values which cannot be known before the protocol starts. Central controller 200 cannot predict $R_0$, so it cannot predict what $M_0$ will look like. Similarly, the party cannot predict $R_1$ so he cannot predict what $M_1$ will look like. Hence, each of them must see the packets before they generate the signatures which means that anyone trying to impersonate the party must have the capability of generating signatures on his behalf This effectively thwarts a replay attack, which can be used to prevent an attacker from gaining, information as demonstrates next.

Suppose an attacker Eve observes a party sending some encrypted packets to central controller 200. Although Eve does not know what the packets contain, she might be able to determine that they contain a resume. If a period of time passes in which the party and central controller 200 do not communicate and then central controller 200 sends the party an encrypted message, Eve's confidence that the party sent a resume should increase. Now, if Eve were to send the same encrypted message to central controller 200 that the party originally sent, eventually central controller 200 will send another encrypted message to the party. The attack that Eve (acting as a requestor) can mount is that she could submit one or more legitimate search requests to central controller 200 and wait for the results. By paying attention to how the size of the response to the request varies, Eve can deduce some information about the party's data. This sort of attack violates the party's privacy. By using the interlock protocol, Eve cannot replay the party's packets to central controller 200 because she won't be able to complete the interlock protocol.

System Operation

Figure 5:
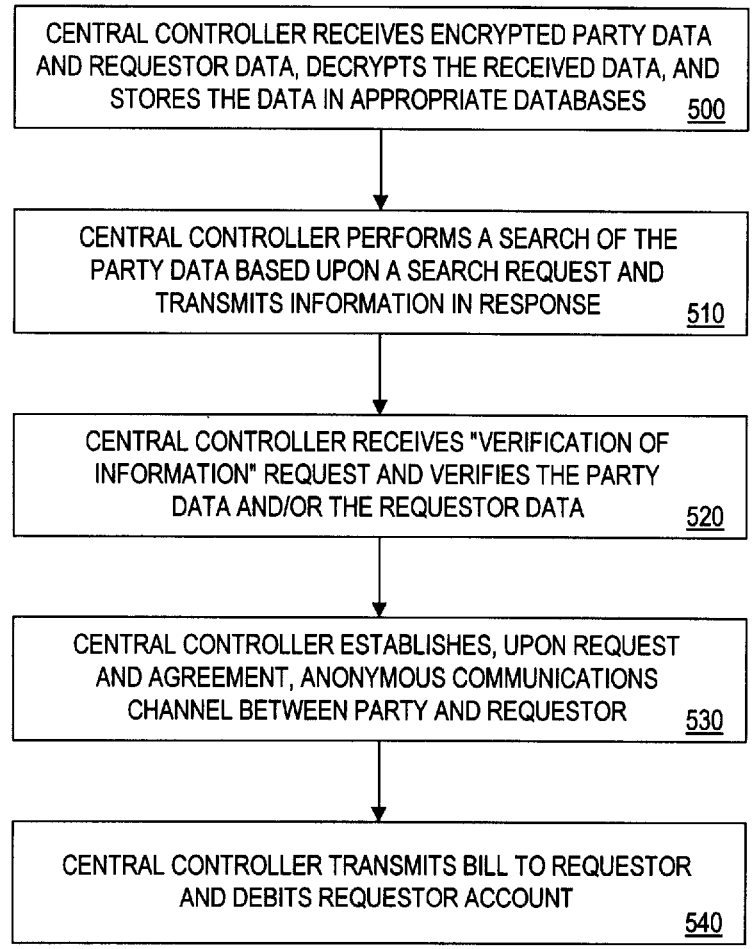
FIG. 5 illustrates a flow diagram of a preferred method for establishing anonymous communications in accordance with this invention.

The operation of system 100 is now described in connection with the flow diagrams shown in FIGS. 5, 6, 7, 8 and 9. FIG. 5 illustrates a flow diagram of a method for providing anonymous communication in accordance with one embodiment of the invention.

As shown in FIG. 5, central controller 200 receives encrypted party data and encrypted requestor data (step 500). Such encrypted party data and requestor data preferably originates from party terminals 300 and requestor terminal 400, respectively. In one embodiment, party terminals 300 prompt respective parties to enter party data by displaying requests for information on video monitor 330. For instance, in the employment search example, video monitor 330 would request information that may be of interest to an employer, such as the candidate's identity, the candidate's address, the candidate's vital statistics, the candidate's work experience, the candidate's educational background, and the candidate's interests. The party would enter party data using input device 345. Cryptographic processor 335 would encrypt the entered party data and modem 350 would transmit the encrypted party data to central controller 200 via network 110.

Requestor terminal 400 preferably operates in a similar manner to prompt a requestor for requestor data, receive and encrypt the requestor data, and transmit encrypted requestor data to central controller 200. Central controller 200 also assigns a pseudonym to each party and requestor whose party data and requestor data is stored in databases 255 and 260, respectively.

After receiving the encrypted party data and requestor data, cryptographic processor 210 of central controller 200 decrypts the received data (step 500). CPU 205 of central controller 200 stores the decrypted data in databases 255 and 260, respectively (step 500).

Central controller 200 receives a search request to identify those parties whose party data satisfies certain criteria (step 510). In a preferred embodiment, the search request originates from requestor terminal 400, where a requestor entered the search request. Before requestor terminal 400 transmits the search request, cryptographic processor 435 of terminal 400 preferably encrypts the search request. Cryptographic processor 210 decrypts the encrypted search request upon receipt at central controller 200. Central controller 200 then searches party data database 255 and, in response to the search, transmits certain information to requestor terminal 400 and party terminal 300 (step 510).

Figure 6A:
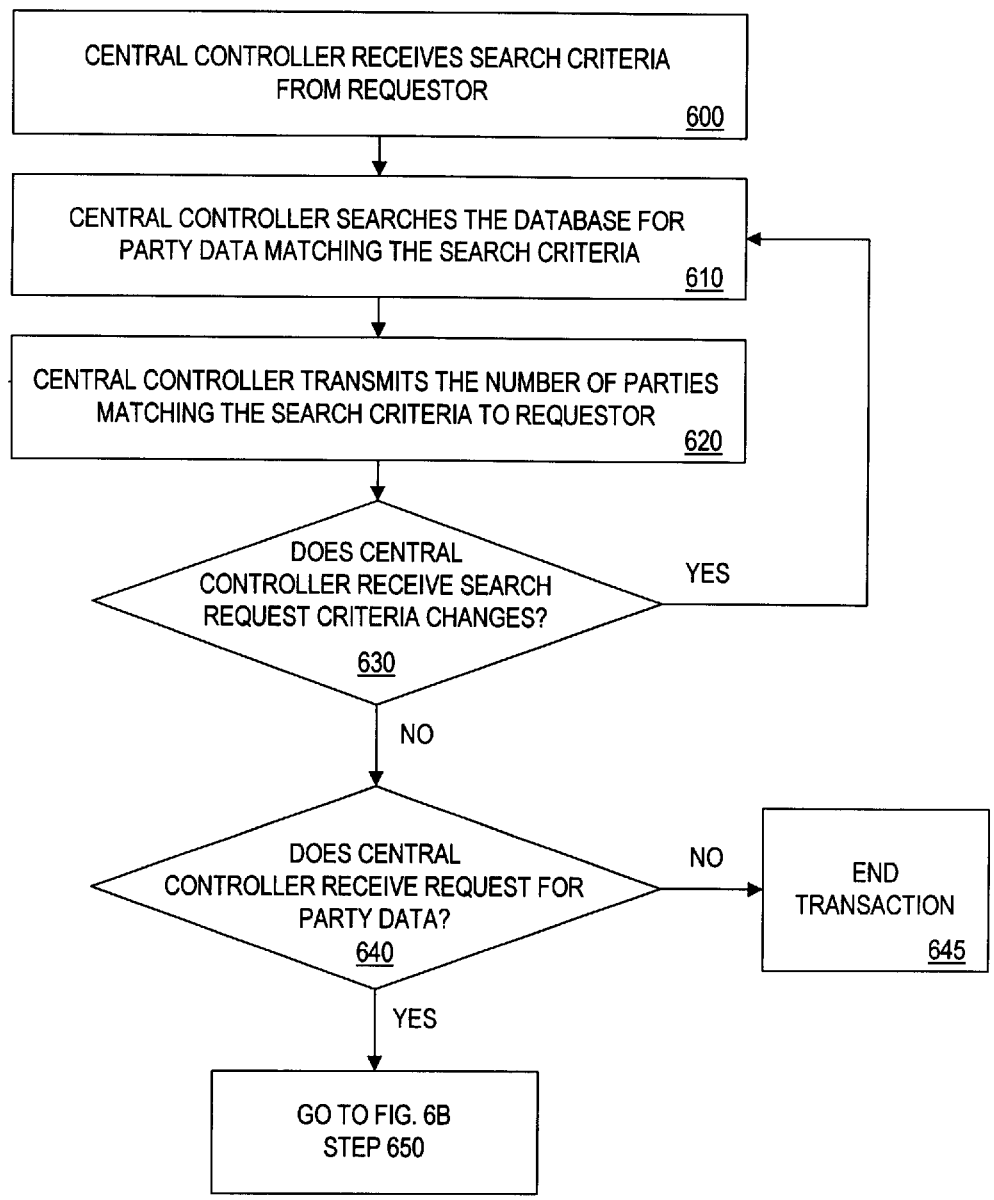
FIGS. 6A–6B illustrate a flow diagram of a preferred method for searching for and releasing party data in accordance with this invention.
Figure 6B:
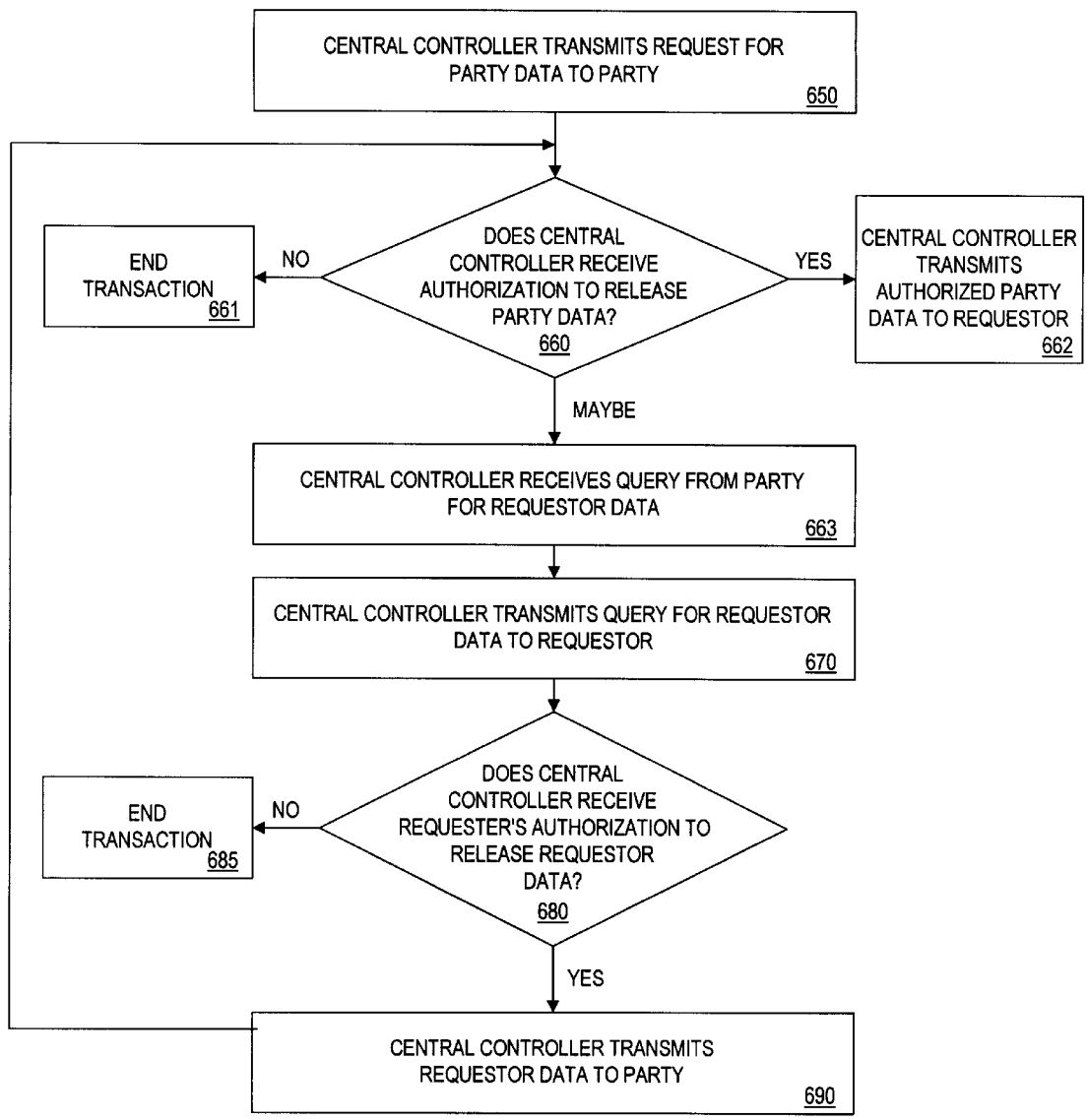

FIGS. 6A and 6B illustrate a flow diagram showing step 510 in more detail. First, central controller 200 receives search criteria from requestor terminal 400 (step 600). This search criteria may include, for example, certain employment qualifications or educational background that an employer is interested in.

In response, central controller 200 searches database 255 for party data satisfying the search criteria (step 610). Controller 200 then transmits to requestor terminal 400 the results of the search, e.g., number of parties that it found to have party data satisfying the criteria (step 620). Alternatively, the number of parties would be transmitted to requestor terminal 400 along with pseudonyms for each of those parties.

Depending on the number of parties found, the requestor may refine or modify the search criteria. If the requestor chooses to modify the search criteria, the requestor enters the new search criteria into requestor terminal 400, which transmits the search criteria to central controller 200 (step 630), and steps 610 and 620 are repeated.

Otherwise, central controller 200 determines whether the requestor requests party data about those parties found as a result of the search (step 640). Central controller 200 does not transmit any further data to the requestor at requestor terminal 400 and the transmission ends (step 645).

If the requestor chooses to request party data (step 640), the requestor enters the party data request into requestor terminal 400, which transmits the request to central controller 200. Central controller 200 transmits an authorization request to party terminals 400 for authorization to release respective parties' party data (step 650).

The party receiving the request for authorization can indicate whether to authorize central controller 200 to release some or all of its party data by entering one of three responses into party terminal 300 (step 660). The responses are sent to central controller 200. If central controller 200 receives a response that indicates that the party does not authorize release of any party data, central controller 200 does not provide any party data to requestor terminal 400, and the transaction ends (step 661). If, on the other hand, central controller 200 receives a response that indicates that the party authorizes release of some or all of its party data, central controller 200 transmits that party data to requestor terminal 400 for the requestor (step 662).

Central controller 200 could also receive a response asking for data about the requestor before authorizing release of its party data (step 663). If so, central controller 200 transmits a query to the requestor at requestor terminal 400 asking for authorization to release requestor data to the party (step 670). If requestor does not authorize release of any requestor data to the party (step 680), central controller 200 does not release any requestor data to the party and the transaction ends (step 685). If the requestor does authorize release of some or all of the requestor data to the party (step 680), central controller 200 transmits the authorized requestor data to the party (step 690). Central controller 200 then awaits the party's response to see whether central controller 200 is authorized to release party data.

To ensure the parties' authorization to release their party data is valid, permission certificates can be used in an alternate embodiment of the present invention. For example, in an employment system embodiment, parties who use the system may not want anyone to know they are hunting for a job. Candidates may not want any of the people they work with to know. As a result, the party would like explicit control over who sees their resume. Therefore, whenever central controller 200 gets a request for a release of party data, central controller 200 needs to obtain explicit permission from the party to send the party's data to the requestor. When a party decides to release his party data, he can be sure his data will be released only to the requestor making the request. The following is a preferred protocol for a party to issue a permission certificate:

1. A requestor "A" submits a request to release party data J and to central controller 200 in order to find out more about the party.
2. Central controller 200 assigns a unique transaction ID, T, to the request and creates a modified request J'=(J,T). The transaction ID, T, helps ensure that each job description (and hence permission certificate) is unique.
3. Central controller encrypts J' using the party's public encryption key and sends the encrypted message to the party. Central controller sends $M_0 = E_{PKE_A}(J', S_{SKS_T}(PKE_A, J'))$ to the party. The party's public key is included as part of the information that central controller 200 signs so a third party cannot forward a copy of a job description they received from central controller 200 to another party.
4. The party decrypts the message to retrieve J', verifies central controller 200's signature, reads the request, and decides if he wants to release his party data. If he doesn't, then he stops the protocol here.
5. The party generates a message M containing the following information:

A pre-defined string which states that he gives his permission to release his party data to the requestor.

A hash of the request H(J'). Note, this is unique to this permission certificate since the transaction ID is unique to the job description.

A string which states the details about how he wants her party data released, whether or not he wishes to remain anonymous, etc.
6. The party signs the message, encrypts it using central controller 200's public encryption key and sends it to central controller 200. Hence, she sends $M_1 = E_{PKE_T}(M, S_{SKS_A}(M))$ to central controller 200.
7. Central controller 200 decrypts the message to retrieve M, verifies the party's signature, and transmits the party's data to the requestor.

Because the party signs the message that central controller 200 sent him in the first step, his signature will only work for the job description that central controller 200 sent him. Hence, central controller 200 cannot use the permission certificate for a different job description. This assumes, of course, that the request to release party data contains information unique to that request, such as a transaction ID number. Central controller 200 embeds the transaction ID in the request to release party data message.

In an alternative embodiment, central controller 200 could assign a different transaction ID to each request and party. Hence, two different parties cannot easily check that they are getting the same request by comparing transaction IDs.

The same protocol can be used in any other situation which also requires a permission certificate. For example, central controller 200 needs to obtain permission from a requestor before releasing his requestor data to a party.

Returning to FIG. 5, central controller 200 can receive an authentication request to verify the authenticity of the origin, authorship, and/or integrity of party data or requestor data (step 520). Upon receiving this request, central controller 200 verifies the data and transmits a verification status to the party or requestor requesting data verification (step 520). Step 520 is described in greater detail in connection with FIG. 7. Central controller 200 receives a verification request from a requestor for verification of party data (step 700). As described above, this verification may include verifying the authenticity of any one of the origin, authorship, and integrity of the party data stored in databases 255.

In response, central controller 200 transmits a verification status request to a verification authority to verify the party data (step 710). For instance, in the employment services example, the party data to be verified may include a university from which a candidate received an advanced degree. In that case, central controller 200 could transmit a verification status request to the candidate's purported educational institution to verify that the candidate did, in fact, receive an advanced degree from that institution.

When central controller 200 receives a response to its request indicating the verification status of the party data, central controller 200 stores the verification status in verification database 270 (step 720), and transmits that verification status to the requestor at requestor terminal 400 (step 730).

Figure 7:
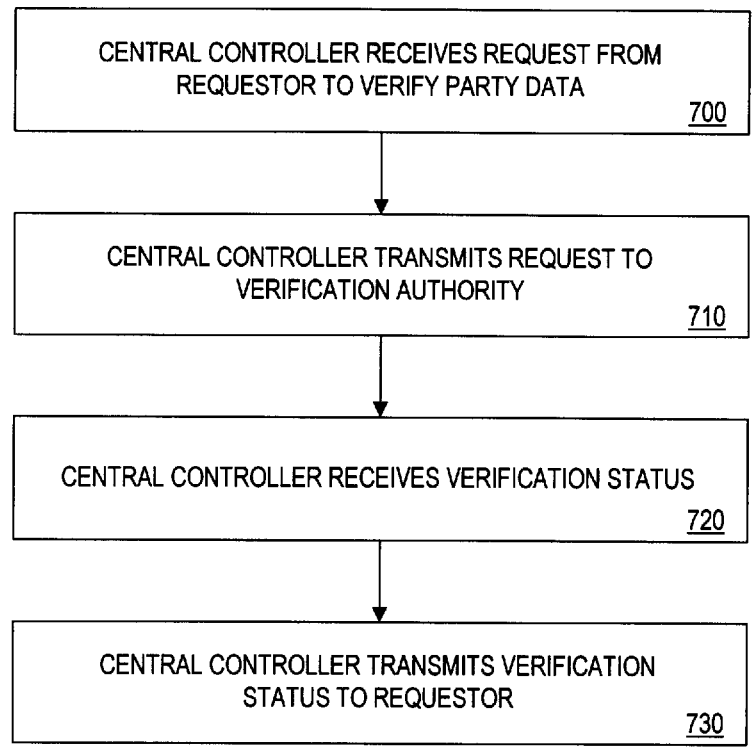
FIG. 7 illustrates a flow diagram of a preferred method for verifying the authenticity and accuracy of party data in accordance with this invention.

The method shown in FIG. 7 could be adapted to verify requestor data. In that case, central controller 200 receives a request from a party to verify requestor data and transmits a request to a verification authority. When central controller 200 receives the verification status from the verification authority, it transmits the verification status to the party.

Figure 8:
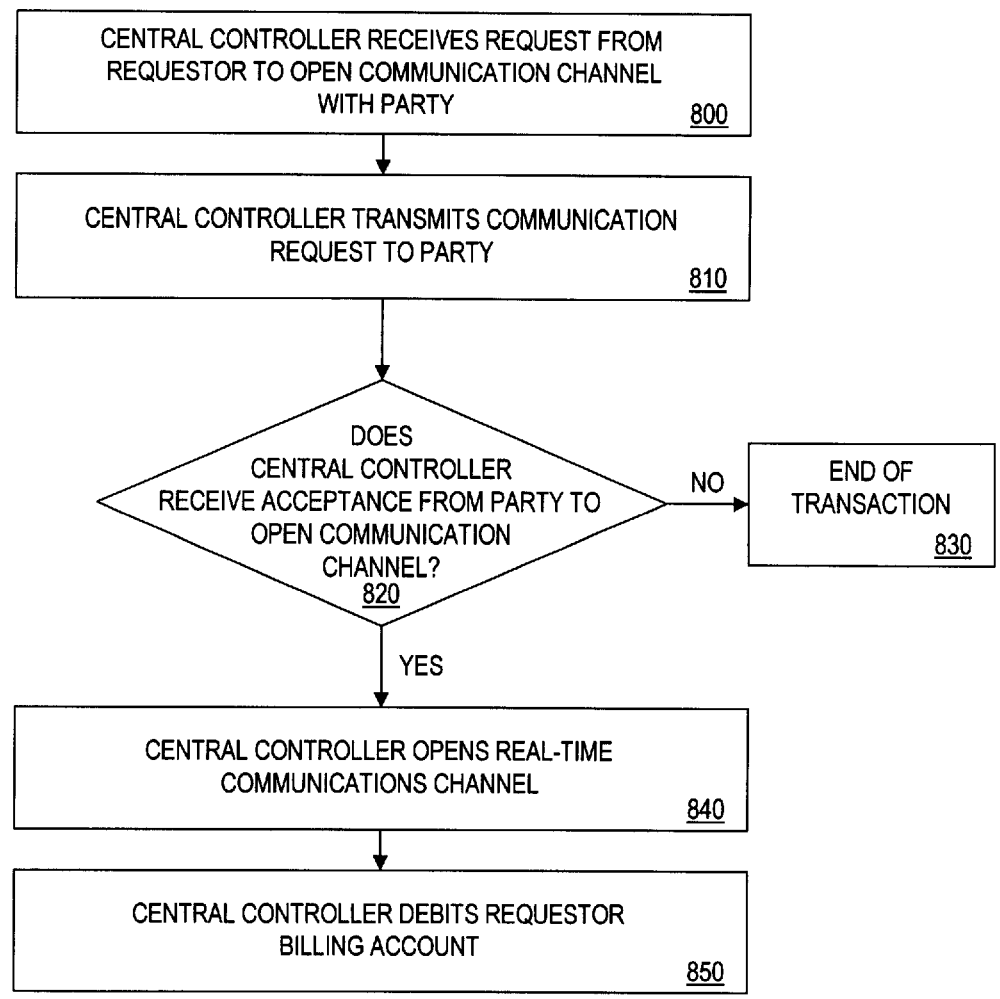
FIG. 8 illustrates a flow diagram of a preferred method for opening a communications channel between a party and a requestor in accordance with this invention.
Figure 9:
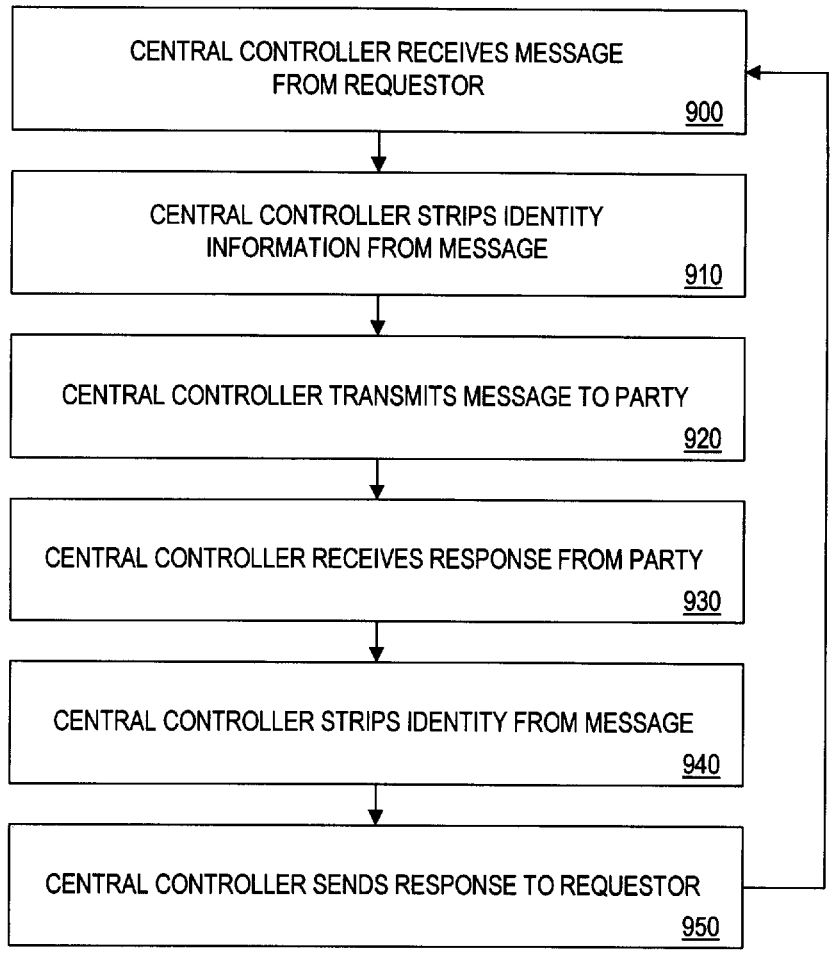
FIG. 9 illustrates a detailed flow diagram of a preferred method for transmitting party and requestor information in a communications channel in accordance with this invention.

Returning to FIG. 5, central controller 200 can establish an anonymous communications channel between a party and requestor (step 530). In this way, the party and the requestor can reveal or request information to and from each other. As described above, the communications channel can be real-time or non-real-time. FIG. 8 shows a flow diagram illustrating one embodiment of a method for opening a communications channel between party terminal 300 and requestor terminal 400 and FIG. 9 shows a flow diagram illustrating one embodiment of a method for managing the communication between party terminal 300 and requestor terminal 400. After receiving a communications channel request from a requestor to open a communications channel with a party (step 800), central controller 200 transmits a communication request to the party at party terminal 300 (step 810). Preferably, the communication request asks the party whether it agrees to engage in a real-time or non-real-time communication with the requestor.

If central controller 200 receives a response indicating that the party does not agree to engage in communication with the requestor (step 820), then central controller 200 does not open the communications channel and the transaction ends (step 830). If central controller 200 receives a response indicating that the party agrees to the request (step 820), central controller 200 opens a communications channel between party terminal 300 and requestor terminal 400 (step 840). The communications channel can be set up as either a real-time or non-real-time connection including an audio system (i.e., a telephone system), an electronic messaging system, and a video communication system. In one embodiment, the communications channel includes a modification processor for modifying voice and/or video.

After opening the communications channel, central controller 200 debits the requestor's billing account stored in database 275 and transmits a bill to the requestor (step 850). Central controller 200 could also collect payment from the requestor using other payment methods including: on-file credit card, periodic statement billing, account debit, and digital cash. Further, in one embodiment, central controller 200 transmits payments to parties for party activities including: allowing central controller 200 to maintain party data in party data database 255, communicating with requestors, and releasing party data.

FIG. 9 illustrates a flow diagram of the method of step 530 for establishing a communications channel, in accordance with one embodiment of the invention. Central controller 200 receives a message from a requestor addressed to a particular party by pseudonym (step 900). Central controller 200 processes the message to remove any information that would reveal the identity of the requestor (step 910) in order to maintain the requestor's anonymity. Central controller 200 transmits the processed message to the party at party terminal 300 (step 920). Central controller 200 receives a response to the message from the party, removes any information that would reveal the identity of the party (step 940), and transmits the processed response to the requestor (step 950).

Removing identity information may also include the use of voice and/or video modification processors in step 910 and 940. Steps 900–950 are repeated to allow multiple messages to pass between the party and the requestor, while maintaining the anonymity of the party and requestor. In one embodiment, central controller 200 debits the requestor billing account according to the usage of the communications channel between the party and the requestor (step not shown). Central controller 200 can measure usage of the communications channel using one of several methods, including: number of messages exchanged, time that central controller 200 maintains the communications channel, the requestor's status (i.e., premium customers pay less), and geographic location of party terminal 300 and/or requestor terminal 400.

Central controller 200 collects payment for certain transactions performed. In accordance with one embodiment of the invention, central controller 200 transmits a bill to the requestor at requestor terminal 400 for each transaction and debits the requestors account (step 540), which is stored in database 275 of central controller 200. In alternative embodiments, the payment scheme can be modified or varied to charge either the requestor or the party or both for various transactions executed by system 100, and particularly central controller 200. In a further embodiment, the payment scheme involves paying the party for submitting information to central controller 200, opening a communications channel, and/or releasing party data to a requestor. In one embodiment of the system, a party is payed each time he authorizes the release of his party data to a requestor. Central controller 200 will monitor the transactions to ensure that parties do not release information to the same requestor more than once in a given period of time.

As stated earlier, maintaining the anonymity of the party and requestor can be important to their communications. For example, an employer may not want its competitors to know that it is looking to expand its staff because it may give them an advantage. An attacker may attempt to examine the message traffic coming in and out of central controller 200 to expose the identity of a user of the system. A way to prevent this type of attack is to use an anonymous mix protocol during communication between a party or requestor and central controller 200.

An anonymous mix uses a protocol to make it very difficult for anyone to trace the path of a message which passes through the mix. The anonymous mix takes outgoing messages from central controller 200 and randomly varies both the length of the message as well as the timing of its delivery. An incoming message of two hundred kilobytes, for example, might be expanded to three hundred kilobytes by adding random characters at the end. An attacker would thus be unable to correlate (by length of message) the incoming requestor query with requests to release party data sent to the various parties. By adding a random time delay in the processing of incoming requests, central controller 200 also prevents an attacker from correlating (based on time) incoming requests with outgoing requests. An example of the anonymous protocol employed in the present invention is set forth below.

Notation and Conventions for this protocol:

a. $PKE_{PKU}(X)$ represents the public-key encryption of X under public key $PK_U$.

b. $SIGN_{SKU}(X)$ represents the digital signature of X under private key $SK_U$.

c. $E_{K0}\}(X)$ represents the symmetric encryption of X under key $K_0$.

d. $PK_U$ represents the public key of user U.

e. $SK_U$ represents the private key of user U.

f. $D_U$ represents the identification number of user U.

g. X,Y represents the concatenation of X with Y.

Keys used in this protocol:

a. $PK_M$ is the anonymous mix public key.

b. $ID_B$ is Bob's ID.

c. $PK_B$ is Bob's public key.

d. $SK_B$ is Bob's private key.

When Alice sends Bob a message through anonymous mix, the following steps could take place:

a. Alice wishes to send message T to Bob anonymously. She first forms:

$K_0$=a random session key.

$P_0$=an all-zero string of some random length.

$X_0=PKE_{PKM}(K_0)$.

$M_0=X_0,E_{K0}(ID_B,P_0,T)$.

Alice then sends $M_0$ to the anonymous mix 180. Note that Alice may also have encrypted and digitally signed the message she's sending to Bob. This has no bearing at all on how the anonymous mix processes it. $P_0$ disguises the size of the message, making it difficult, or virtually impossible, to correlate incoming messages with outgoing messages.

b. The anonymous mix receives $M_0$. Using $X_0$, anonymous mix decodes the random session key $K_0$ using anonymous mix private key $SK_M$ and then using $K_0$, $ID_B$, T and $P_O$ are decrypted. The anonymous mix looks up Bob's public key from $ID_B$, and then forms:

$K_1$=a random session key.

$P_1$=an all-zero string of some random length.

$X_1=PKE_{PKB}(K_1)$.

$M_1=X_1E_{K1}(P_1,T)$

Anonymous mix waits some random amount of time before sending $M_1$ to Bob. During this time, it is processing many other messages, both sending and receiving them.

c. Bob receives $M_1$. He decrypts it using his private key, $SK_B$ and recovers T. He then does whatever he needs to with T.

In order to make messages that pass through an intermediary anonymous mix anonymous, a large volume of messages coming in and out are reviewed. A random delay involved in forwarding those messages may also be required. Otherwise, it is possible for an opponent to watch messages going into and coming out of anonymous mix, using this information to determine the source and destination of each message. Similarly, messages must be encrypted to the anonymous mix, so that the messages can be decrypted and re-encrypted with a different key. Also, messages may need to be broken into many pieces or padded with large blocks of data, to avoid having message lengths give away information. Anonymous mix either knows everyone's public keys or their public keys are sent along with their identities. Every user is assumed to know anonymous mix's public keys. The anonymous mix, used in combination with encryption and digital signatures discussed earlier, provides a high level of anonymity for both parties and requestors.

Anonymity may also serve to prevent a requestor and party from contacting each other outside the system in order to ensure that payment is received for bringing the two together. In this embodiment, central controller 200 forces anonymity by blinding one or both parties. The requestor, for example, may not see the name of the party until the requestor's account has been debited.

FIGS. 8 and 9 illustrate a method in which a communications channel between a party and requestor is established and managed by system 100 without either the party or the requestor learning the other's identity. While FIGS. 8 and 9 illustrate methods in which central controller 200 establishes the communications channel at a requestor's request, in alternative embodiments, a communications channel can be established at a party's request. In that case, central controller 200 receives a request for a communications channel from party terminal 300, transmits the request to requestor terminal 400, and establishes a communications channel in accordance with the requestor's response.

While the invention, as embodied and described in connection with system 100, can be applied to the employment search process, the invention can also be applied to a variety of other areas involving anonymous communications. For instance, system 100 can be used in connection with matchmaking (i.e., providing dating services). People, or "parties," interested in dating can enter personal data, or "party data," about themselves at party terminals 300. For each party, the party data may include the party's identity, the party's vital statistics, the party's background, and the party's interests. Central controller 200 and party terminals 300 receive and transmit the party data in the manner described above.

People, or "requestors," who would like to find parties whose personal data satisfies their interests or tastes can enter a search request at requestor terminal 400. In one embodiment, requestors enter data, or "requestor data," about themselves at request terminal 400, which encrypts and transmits the requestor data to central controller 200. In addition, each requestor enters, at request terminal 400, a search request specifying attributes about people that the requestor would like to date. For instance, the search request may specify that the requestor is interested in identifying men that are at least 6' tall and are college-educated. Request terminal 400 encrypts the search request and transmits the encrypted search request to central controller 200 for processing, as described above.

In response to the search request, central controller 200 preferably transmits to requestor terminal 400 the number of people found to satisfy the criteria in the request, as described above in connection with FIG. 6A. In the example given above, central controller 200 would transmit to requestor terminal 400 the number of people who indicated that they are men, 6' tall, and college-educated, as revealed by party data database 255. Central controller 200 releases party data and requestor data to the requestor and parties, respectively, in the manner described above in connection with FIG. 6B. Central controller 200 can verify data, as described in connection with FIG. 7, and open a communications channel between a requestor and a party, as described in connection with FIGS. 8 and 9. When central controller 200 opens the communications channel, the requestor and the party can exchange adequate information about themselves to decide whether to agree to a date without subjecting themselves to any risk if either should decide not to agree to the date.

The employment search and dating services examples demonstrate how the invention can: allow a requestor to search for parties meeting certain criteria, allow parties to control the release of information about themselves, and provide a communications channel between a requestor and the parties while maintaining the anonymity of the parties and the requestor from each other. The invention, however, is not limited to those types of applications. Other applications include finding and interviewing consultants or freelancers for a specific project, auditioning actors and actresses, seeking a merger partner, and engaging in various commerce-based applications in which controlled anonymity by any party would be beneficial.

The invention can be used in applications where the system establishes a communications channel between parties and authenticates information about the parties, while maintaining the anonymity of at least one of the parties. In one embodiment, system 100, as described above, could be used for such applications. This embodiment allows two parties to communicate while each party is ensured that the information being communicated is valid. For example, in the case of a "whistle-blowing" application (outlined below) an employer can be certain that the information he receives is from an employee within his organization. The methods illustrated by the flow diagrams of FIGS. 5–9 could be readily adapted for these applications.

By way of example, system 100 could be used as a "whistle-blowing" system to allow employees of a company to anonymously report legal and policy violations without risking retribution by the company's management. The employee reporting a violation would preferably enter, into party terminal 300, data about the violation and data that can be independently verified as originating from the employee claiming the violation. The employee is referred to hereafter as the "party" and the data entered into party terminal 300 is referred to hereafter as the "party data." In one embodiment, the party data may include an employee identification number uniquely identifying each employee of the company. Party terminal 300 encrypts and transmits the party data to central controller 200, preferably in the manner described above.

A company representative, referred to as the "requestor," would use requestor terminal 400 to access the party data stored in central controller 200. After accessing the party data about the violation, the requestor could submit a request at requestor terminal 400 to have some or all of the party data authenticated. For example, central controller 200 could verify that the party is, in fact, an employee of the company by comparing an employee identification number contained in the party data with a list of active company employee identification numbers. If the number matches, central controller 200 would transmit a response to requestor terminal 400 confirming that the party is an active employee of the company.

The requestor, or the party, could enter a request into requestor terminal 400, or party terminal 300, for central controller 200 to open a communications channel with the party, or the requestor. Central controller 200 would open a communications channel, as described above in connection with FIGS. 8 and 9, to allow the party and the requestor to communicate, while maintaining the party's anonymity. This would allow the employer to question the employee about details relating to the incident in question, without the employee revealing his identity.

In another example, system 100 could be used as a system to allow parties to remain anonymous while negotiating an agreement. For instance, criminals, or rule offenders, anonymously offer to turn themselves in, while negotiating favorable treatment. In this case, the criminals, or rule offenders, would represent the "parties" and law enforcement, or rule enforcers, would represent the "requestors." In a preferred embodiment, a party would enter, at party terminal 300, information ("party data") about his violation and data that can be independently verified as originating from the party claiming the violation. The party data can include the party's identity, which is preferably only used by system 100 for verification purposes. Party terminal 300 would encrypt and transmit the party data to central controller 200, in the manner described above. A requestor would use requestor terminal 400 to access the party data stored in central controller 200.

The requestor could enter a request for authentication of the party data into requestor terminal 300, which would transmit the request to central controller 200. Central controller 200 would verify some or all of the party data, as described above, and transmit a verification status message to requestor terminal 400. Upon request from either party terminal 300 or requestor terminal 400, central controller can establish an anonymous communications channel with the other terminal, provided that the party and the requestor agree to engage in the communications channel. As described above, this communications channel can be real-time or non-real-time.

Under the "plea bargaining" example, the invention allows the requestor and the party to negotiate the terms of the party's sentence or punishment for committing the violation before the party reveals his identity. If negotiations fail, the party does not subject himself to any risk that the requestor will learn his identity simply because he initiated communication. The requestor, of course, can use whatever information the party revealed about himself during the course of the negotiation to learn the identity of the party.

Besides the whistle-blowing and plea bargaining examples, the invention also applies to other applications, such as authenticated phone-based tip lines and licensing negotiations where a licensee does not want to reveal the size of his company for fear of being charged more by the licensor.

Conclusion

It will be apparent to those skilled in the art that various modifications and variations can be made in the system and method of the present invention without departing from the spirit or scope of the invention. The present invention cover the modifications and variations of this invention provided they come within the scope of the appended claims and their equivalents.

What is claimed is:

1. A method for operating a computer system to facilitate an exchange of identities between two anonymous parties, comprising the steps of:

receiving from a first party first data including an identity of said first party;

receiving from said first party at least two first-party rules for releasing said first data including a rule for releasing said identity of said first party;

receiving from a second party a search request comprising at least one search criterion;

receiving from said second party second data including an identity of said second party;

receiving from said second party at least two second-party rules for releasing said second party data including a rule for releasing said identity of said second party;

processing said search request to determine if said first data satisfies said search criterion; and if said first data satisfies said search criterion, then
exchanging said first and second data, except said identities of said first and second parties, between said first and second parties in accordance with said first-party and second-party rules,
after said exchanging step, upon satisfying said first-party rule for releasing said identity of said first party, transmitting said identity of said first party to said second party, and
after said exchanging step, upon satisfying said second-party rule for releasing said identity of said second party, transmitting said identity of said second party to said first party.

2. A method in accordance with claim 1 wherein said step of receiving from a first party at least two first-party rules includes receiving at least one first-party rule before receiving said search request and storing said at least one first-party rule.

3. A method in accordance with claim 2 wherein said step of receiving from a first party at least two first-party rules includes requesting at least one first-party rule from said first party after receiving said search request.

4. A method in accordance with claim 3 wherein said at least one first-party rule received after said search request includes an authorization to release said identity of said first party.

5. A method in accordance with claim 1 wherein said step of receiving from said second party at least two second-party rules includes receiving at least one second-party rule before receiving said search request and storing said at least one second-party rule.

6. A method in accordance with claim 5 wherein said step of receiving from a second party at least two second-party rules includes requesting at least one second-party rule from said second party after processing said search request.

7. A method in accordance with claim 6 wherein said at least one second-party rule received after processing said search request includes an authorization to release said identity of said second party.

8. A method in accordance with claim 1 and further including, subsequent to said step of exchanging said first and second data, the step of receiving a request to establish a communications channel between said first and second parties prior to releasing the identity of at least one of said first and second parties.

9. A method in accordance with claim 8 and further including the step of establishing said communications channel between said first and second parties.

10. A method in accordance with claim 1 wherein at least one of said first-party rules is conditional on the content of said second data.

11. A method in accordance with claim 1 wherein at least one of said second-party rules is conditional on the content of said first data.

12. A system for facilitating an exchange of identities between two anonymous parties, comprising:

means for receiving from a first party first data including an identity of said first party;

means for receiving from said first party at least two first-party rules for releasing said first data including a rule for releasing said identity of said first party;

means for receiving from a second party a search request comprising at least one search criterion;

means for receiving from said second party second data including an identity of said second party;

means for receiving from said second party at least two second-party rules for releasing said second party data including a rule for releasing said identity of said second party;

means for processing said search request to determine if said first data satisfies said search criterion; and means for, if said first data satisfies said search criterion, exchanging said first and second data, except said identities of said first and second parties, between said first and second parties in accordance with said first-party and second-party rules, after said exchanging, upon satisfying said first-party rule for releasing said identity of said first party, transmitting said identity of said first party to said second party, and after said exchanging, upon satisfying said second-party rule for releasing said identity of said second party, transmitting said identity of said second party to said first party.

13. A system in accordance with claim 12 wherein said means for receiving from a first party at least two first-party rules includes means for receiving at least one first-party rule before receiving said search request and storing said at least one first-party rule.

14. A system in accordance with claim 13 wherein said means for receiving from a first party at least two first-party rules includes means for requesting at least one first-party rule from said first party after receiving said search request.

15. A system in accordance with claim 14 wherein said at least one first-party rule received after said search request includes an authorization to release said identity of said first party.

16. A system in accordance with claim 12 wherein said means for receiving from said second party at least two second-party rules includes means for receiving at least one second-party rule before receiving said search request and storing said at least one second-party rule.

17. A system in accordance with claim 16 wherein said means for receiving from a second party at least two second-party rules includes requesting at least one second-party rule from said second party after processing said search request.

18. A system in accordance with claim 17 wherein said at least one second-party rule received after processing said search request includes an authorization to release said identity of said second party.

19. A system in accordance with claim 12 and further including, subsequent to said exchanging said first and second data, means for receiving a request to establish a communications channel between said first and second parties prior to releasing the identity of at least one of said first and second parties.

20. A system in accordance with claim 19 and further including means for establishing said communications channel between said first and second parties.

21. A system in accordance with claim 12 wherein at least one of said first-party rules is conditional on the content of said second data.

22. A system in accordance with claim 12 wherein at least one of said second-party rules is conditional on the content of said first data.

23. A system for facilitating an exchange of identities between two anonymous parties, comprising:

a processor; and a memory connected to said processor and storing a program for controlling the operation of said processor;

said processor operative with said program in said memory to:

receive from a first party and store in said memory first data including an identity of said first party;

receive from said first party and store in said memory at least two first-party rules for releasing said first data including a rule for releasing said identity of said first party;

receive from a second party and store in said memory a search request comprising at least one search criterion;

receive from said second party and store in said memory second data including an identity of said second party;

receive from said second party and store in said memory at least two second-party rules for releasing said second party data including a rule for releasing said identity of said second party;

process said search request against said first data in said memory to determine if said first data satisfies said search criterion; and if said first data satisfies said search criterion, then exchange said first and second data, except said identities, between said first and second parties in accordance with said first-party and second-party rules, after said exchanging operation, upon satisfying said first-party rule for releasing said identity of said first party, transmit said identity of said first party to said second party, and after said exchanging operation, upon satisfying said second-party rule for releasing said identity of said second party, transmit said identity of said second party to said first party.

24. A system in accordance with claim 23 wherein said step of receiving from a first party at least two first-party rules includes receiving at least one first-party rule before receiving said search request and storing said at least one first-party rule.

25. A system in accordance with claim 24 wherein said step of receiving from a first party at least two first-party rules includes requesting at least one first-party rule from said first party after receiving said search request.

26. A system in accordance with claim 25 wherein said at least one first-party rule received after said search request includes an authorization to release said identity of said first party.

27. A system in accordance with claim 23 wherein said step of receiving from said second party at least two second-party rules includes receiving at least one second-party rule before receiving said search request and storing said at least one second-party rule.

28. A system in accordance with claim 27 wherein said step of receiving from a second party at least two second-party rules includes requesting at least one second-party rule from said second party after processing said search request.

29. A system in accordance with claim 28 wherein said at least one second-party rule received after processing said search request includes an authorization to release said identity of said second party.

30. A system in accordance with claim 23 and further including, subsequent to said step of exchanging said first and second data, the step of receiving a request to establish a communications channel between said first and second parties prior to releasing the identity of at least one of said first and second parties.

31. A system in accordance with claim 30 and further including the step of establishing said communications channel between said first and second parties.

32. A system in accordance with claim 23 wherein at least one of said first-party rules is conditional on the content of said second data.

33. A system in accordance with claim 23 wherein at least one of said second-party rules is conditional on the content of said first data.

\* \* \* \* \*

UNITED STATES PATENT AND TRADEMARK OFFICE
CERTIFICATE OF CORRECTION

| | | |
|---|---|---|
| PATENT NO. | : 5,884,270 | |
| APPLICATION NO. | : 08/704314 | |
| DATED | : March 16, 1999 | |
| INVENTOR(S) | : Jay S. Walker et al. | |

It is certified that error appears in the above-identified patent and that said Letters Patent is hereby corrected as shown below:

In column 24, line 6 (in the 5th "receiving" step of claim 1):
    please replace the term "said second party data" with --said second data--.

In column 25, line 9 (in the 5th "means for" element of claim 12):
    please replace the term "said second party data" with --said second data--.

In column 26, line 22 (in the 5th "receive" element of claim 23):
    please replace the term "said second party data" with --said second data--.

Signed and Sealed this
Thirty-first Day of July, 2012

David J. Kappos
*Director of the United States Patent and Trademark Office*